United States Patent
Nakata et al.

(10) Patent No.: US 10,280,109 B2
(45) Date of Patent: May 7, 2019

(54) SULFIDE GLASS AND CRYSTALLINE SOLID ELECTROLYTE PRODUCTION METHOD, CRYSTALLINE SOLID ELECTROLYTE, SULFIDE GLASS AND SOLID-STATE BATTERY

(71) Applicant: IDEMITSU KOSAN CO., LTD., Chiyoda-ku (JP)

(72) Inventors: Akiko Nakata, Sodegaura (JP); Junpei Maruyama, Sodegaura (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 47 days.

(21) Appl. No.: 15/522,580

(22) PCT Filed: Oct. 30, 2015

(86) PCT No.: PCT/JP2015/005477
§ 371 (c)(1),
(2) Date: Apr. 27, 2017

(87) PCT Pub. No.: WO2016/067631
PCT Pub. Date: May 6, 2016

(65) Prior Publication Data
US 2018/0016185 A1 Jan. 18, 2018

(30) Foreign Application Priority Data

Oct. 31, 2014 (JP) .................... 2014-223157
Mar. 13, 2015 (JP) .................... 2015-051301
(Continued)

(51) Int. Cl.
C03C 3/32 (2006.01)
C03C 1/02 (2006.01)
(Continued)

(52) U.S. Cl.
CPC .......... *C03C 3/32* (2013.01); *C03C 1/02* (2013.01); *C03C 3/321* (2013.01); *C03C 4/14* (2013.01);
(Continued)

(58) Field of Classification Search
CPC .................. C03C 3/321; H01M 10/0562
See application file for complete search history.

(56) References Cited

U.S. PATENT DOCUMENTS 5,958,281 A 9/1999 Takada et al.
9,051,201 B2 * 6/2015 Aburatani .......... C03C 1/02
(Continued)

FOREIGN PATENT DOCUMENTS

EP 2 779 298 A1 9/2014
JP 7-330312 A 12/1995
(Continued)

OTHER PUBLICATIONS

Extended European Search Report dated Jun. 19, 2018 in Patent Application No. 15854516.0, 7 pages.
(Continued)

*Primary Examiner* — Karl E Group
(74) *Attorney, Agent, or Firm* — Oblon, McClelland, Maier & Neustadt, L.L.P.

(57) ABSTRACT

A method for producing sulfide glass wherein phosphorus sulfide satisfying the following formula (1) is used as a raw material:

$$100 \times A/B \geq 37 \tag{1}$$

wherein in the formula, A is peak areas of peaks that appear at peak positions in a range of 57.2 ppm or more and 58.3 ppm or less, and 63.0 ppm or more and 64.5 ppm or less in $^{31}$PNMR spectroscopy, and B is the total of peak areas of all peaks measured in $^{31}$PNMR spectroscopy.

18 Claims, 5 Drawing Sheets

(30) Foreign Application Priority Data

Sep. 18, 2015 (JP) ................................ 2015-185838
Sep. 18, 2015 (JP) ................................ 2015-185845

(51) Int. Cl.

| | |
|---|---|
| *C03C 4/14* | (2006.01) |
| *H01M 10/0562* | (2010.01) |
| *H01B 1/06* | (2006.01) |
| *H01B 1/10* | (2006.01) |
| *H01B 13/00* | (2006.01) |
| *H01M 4/587* | (2010.01) |
| *H01M 4/62* | (2006.01) |
| *H01M 10/052* | (2010.01) |
| *H01M 10/0525* | (2010.01) |

(52) U.S. Cl.

CPC ................ *H01B 1/06* (2013.01); *H01B 1/10* (2013.01); *H01B 13/00* (2013.01); *H01M 4/587* (2013.01); *H01M 4/62* (2013.01); *H01M 10/052* (2013.01); *H01M 10/0525* (2013.01); *H01M 10/0562* (2013.01); *H01M 2300/008* (2013.01)

(56) References Cited

U.S. PATENT DOCUMENTS

| | | | |
|---|---|---|---|
| 9,196,925 B2 * | 11/2015 | Aburatani | ................. C03C 4/18 |
| 2007/0196739 A1 | 8/2007 | Seino et al. | |
| 2009/0159839 A1 | 6/2009 | Seino et al. | |
| 2010/0200795 A1 | 8/2010 | Ota et al. | |
| 2014/0141341 A1 | 5/2014 | Ohtomo et al. | |
| 2014/0227610 A1 | 8/2014 | Aburatani et al. | |
| 2014/0302382 A1 | 10/2014 | Kambara et al. | |
| 2015/0214575 A1 * | 7/2015 | Aburatani | ................. C03C 1/02 |
| | | | 429/322 |
| 2015/0270571 A1 | 9/2015 | Kambara et al. | |
| 2015/0357675 A1 | 12/2015 | Ohtomo et al. | |
| 2016/0043433 A1 | 2/2016 | Aburatani et al. | |
| 2016/0133989 A1 | 5/2016 | Suzuki et al. | |
| 2017/0194662 A1 | 7/2017 | Kambara et al. | |
| 2017/0222261 A1 | 8/2017 | Kambara et al. | |

FOREIGN PATENT DOCUMENTS

| | | |
|---|---|---|
| JP | 9-283156 | 10/1997 |
| JP | 2002-109955 A | 4/2002 |
| JP | 2010-140893 A | 6/2010 |
| JP | 2010-163356 A | 7/2010 |
| JP | 2011-84438 A | 4/2011 |
| JP | 2013-16423 A | 1/2013 |
| JP | 2013-116837 A | 6/2013 |
| JP | 2013-201110 A | 10/2013 |
| JP | 2015-11898 A | 1/2015 |
| WO | WO 2005/040039 A1 | 5/2005 |
| WO | WO 2007/066539 A1 | 6/2007 |
| WO | WO 2009/047977 A1 | 4/2009 |
| WO | WO 2013/042371 A1 | 3/2013 |
| WO | WO 2014/073197 A1 | 5/2014 |
| WO | WO 2014/208180 A1 | 12/2014 |

OTHER PUBLICATIONS

International Search Report dated Jan. 26, 2016 in PCT/JP2015/005477.

International Preliminary Report on Patentability and Written Opinion of the International Searching Authority dated May 11, 2017 in PCT/JP2015/005477 filed Oct. 30, 2015 (submitting English translation).

Fuminori Mizuno, et al., "High Lithium Ion Conducting Glass-Ceramics in the System $Li_2S$—$P_2S_5$" Solid State Ionics, vol. 177, Oct. 31, 2006, pp. 2721-2725 and cover page.

Ryoji Kanno, et al., "Lithium Ionic Conductor Thio-LISICON" Journal of the Electrochemical Society, vol. 148, No. 7, Jul. 2001, pp. A742-A746 and cover page.

\* cited by examiner

SULFIDE GLASS AND CRYSTALLINE SOLID ELECTROLYTE PRODUCTION METHOD, CRYSTALLINE SOLID ELECTROLYTE, SULFIDE GLASS AND SOLID-STATE BATTERY

TECHNICAL FIELD

The invention relates to a method for producing sulfide glass and a crystalline solid electrolyte.

Further, the invention relates to a crystalline solid electrolyte, sulfide glass and a solid-state battery.

BACKGROUND ART

With the recent development of mobile communication and information electronic devices, demand for high-capacity and light-weight lithium ion secondary batteries tends to be increased. Most of electrolytes that exhibit high lithium ion conductivity at room temperature are liquids, and many of commercially-available lithium ion secondary batteries use an organic electrolyte solution. Lithium ion secondary batteries that use this organic electrolyte solution involves a risk of leakage, ignition and explosion, and hence a safer battery has been demanded.

An all-solid battery using a solid electrolyte obtained by mixing a lithium compound, a halogen compound, and phosphorus sulfide in place of the organic electrolytic solution has a feature that leakage and ignition of the electrolyte hardly occur. Here, as the solid electrolyte, a sulfide-based solid electrolyte having high safety and high ionic conductivity has been developed (Patent Documents 1 to 3).

The sulfide-based solid electrolytes disclosed in Patent Documents 1 to 3 exhibit high ionic conductivity by crystallizing sulfide glass by subjecting it to a heat treatment. However, a heat-treatment temperature range at which a high ionic conductivity is exhibited is narrow, and hence production is difficult. In particular, there is a problem that if large-sized production equipment is used in order to conduct mass production, heating at uniform temperatures becomes difficult.

RELATED ART DOCUMENTS

Patent Documents

Patent Document 1: JP-A-2013-016423
Patent Document 2: JP-A-2013-201110
Patent Document 3: WO2007/066539

SUMMARY OF THE INVENTION

An object of the invention is to provide a method for producing sulfide glass capable of obtaining a crystalline solid electrolyte that is easy to produce.

Another object of the invention is to provide sulfide glass which can be crystallized by heating at a wide range of heating temperatures.

Still another object of the invention is to provide a crystalline solid electrolyte that is easy to produce.

[First Invention]

According to the first invention, the following method for producing sulfide glass or the like are provided.

1. A method for producing sulfide glass wherein phosphorus sulfide satisfying the following formula (1) is used as a raw material:

$$100 \times A/B \geq 37 \tag{1}$$

wherein in the formula, A is peak areas of peaks that appear at peak positions in a range of 57.2 ppm or more and 58.3 ppm or less, and 63.0 ppm or more and 64.5 ppm or less in $^{31}$PNMR spectroscopy, and B is the total of peak areas of all peaks measured in $^{31}$PNMR spectroscopy.

2. A method for producing sulfide glass wherein phosphorus sulfide satisfying the following formula (2) is used as a raw material:

$$37 \leq 100 \times (A+D)/B \leq 70 \tag{2}$$

wherein in the formula, A is peak areas of peaks that appear at peak positions in a range of 57.2 ppm or more and 58.3 ppm or less, and 63.0 ppm or more and 64.5 ppm or less in $^{31}$PNMR spectroscopy, D is peak areas of peaks that appear at peak positions in a range of 84.0 ppm or more and 86.0 ppm or less, and 110 ppm or more and 113 ppm or less in $^{31}$PNMR spectroscopy, and B is the total of peak areas of all peaks measured in $^{31}$PNMR spectroscopy.

3. A method for producing sulfide glass wherein phosphorus sulfide satisfying the following formulas (3) to (5) are used as a raw material:

$$37 \leq 100 \times A/B \leq 60 \tag{3}$$

$$25 \leq 100 \times C/B \leq 60 \tag{4}$$

$$0 \leq 100 \times D/B \leq 10 \tag{5}$$

wherein in the formulas, A is peak areas of peaks that appear at peak positions in a range of 57.2 ppm or more and 58.3 ppm or less, and 63.0 ppm or more and 64.5 ppm or less in $^{31}$PNMR spectroscopy, C is peak areas of peaks that appear in a range of 56.6 ppm or more and 57.1 ppm or less in $^{31}$PNMR spectroscopy, and D is peak areas of peaks that appear in a range of 84.0 ppm or more and 86.0 ppm or less, and 110 ppm or more and 113 ppm or less in $^{31}$PNMR spectroscopy, and B is the total of peak areas of all peaks measured in $^{31}$PNMR spectroscopy.

4. The method for producing sulfide glass according to any one of 1 to 3, wherein phosphorus sulfide satisfying the following formula (6) is used as a raw material:

$$0.1 \leq 100 \times D/B \leq 10 \tag{6}$$

wherein in the formula, D is peak areas of peaks that appear at peak positions in a range of 84.0 ppm or more and 86.0 ppm or less, and 110 ppm or more and 113 ppm or less in $^{31}$PNMR spectroscopy, and B is the total of peak areas of all peaks measured in $^{31}$PNMR spectroscopy.

5. A method for producing a crystalline solid electrolyte wherein the sulfide glass produced by the production method according to any one of 1 to 4 is heated.

6. The method for producing a crystalline solid electrolyte according to 5 that satisfies the following formulas (7) and (8):

$$Tc1-18 \leq T \leq Tc1+150 \tag{7}$$

$$T < Tc2 \tag{8}$$

wherein in the formulas, T is a heating temperature, Tc1 is the temperature of an exothermic peak that appears for the first time when sulfide glass is subjected to differential thermogravimetry in a dry nitrogen atmosphere at a temperature-elevating rate of 10° C./min from 20° C. to 600° C., and Tc2 is the temperature of an exothermic peak that appears subsequent to the appearance of an exothermic peak of which the temperature is Tc1.

7. Sulfide glass produced by the method for producing sulfide glass according to any one of 1 to 4.

8. A crystalline solid electrolyte produced by the method for producing a crystalline solid electrolyte according to 5 or 6.
9. Sulfide glass satisfying the following formula (9):

$$Tc1+45 \leq Tc2 \quad (9)$$

wherein in the formula, Tc1 is the temperature of an exothermic peak that appears for the first time when sulfide glass is subjected to differential thermogravimetry in a dry nitrogen atmosphere at a temperature-elevating rate of 10° C./min from 20° C. to 600° C., and Tc2 is the temperature of an exothermic peak that appears subsequent to the appearance of an exothermic peak of which the temperature is Tc1.
10. The sulfide glass according to 9 that comprises a sulfur element and a lithium element.

[Second Invention]

According to the second invention, the following crystalline solid electrolyte or the like are provided.
11. A crystalline solid electrolyte that comprises lithium, phosphorus and sulfur as constitutional components, and has diffraction peaks at least at 2θ=18.9±0.5 deg, 21.5±0.5 deg and 38.6±0.5 deg in powder X-ray diffractometry (CuKα:λ=1.5418 Å).
12. The crystalline solid electrolyte according to 11 that has diffraction peaks at 2θ=17.6±0.5 deg and 23.5±0.5 deg in powder X-ray diffractometry (CuKα:λ=1.5418 Å).
13. The crystalline solid electrolyte according to claim 11 or 12 that has a diffraction peak at 2θ=34.6±0.5 deg in powder X-ray diffractometry (CuKα:λ=1.5418 Å).
14. The crystalline solid electrolyte according to any of 11 to 13, wherein the molar ratio of the lithium, the phosphorus and the sulfur (lithium element:phosphorus element:sulfur element) is 0.1 to 12:1 to 2:0.1 to 9.
15. The crystalline solid electrolyte according to any one of 11 to 14, wherein phosphorus sulfide is used as a raw material and the phosphorus sulfide comprises 37 mol % or more of a $P_4S_9$ structure.
16. Sulfide glass that comprises lithium, phosphorus and sulfur as constitutional components, and is capable of obtaining the crystalline solid electrolyte according to any one of 11 to 15 at least at one or more points in a temperature range of 160 to 350° C. when it is subjected to a heat treatment every one degree centigrade in said temperature range of 160 to 350° C.
17. The sulfide glass according to 16 that has ionic conductivity.
18. An electrode mix comprising a solid electrolyte and an electrode active material, wherein the solid electrolyte comprises at least one of the crystalline solid electrolyte according to any of 11 to 15 and the sulfide glass according to 17.
19. A solid battery, comprising:
an electrode that comprises a first solid electrolyte and an electrode active material; and
an electrolyte layer that comprises a second solid electrolyte,
wherein at least one of the first solid electrolyte and the second solid electrolyte comprises at least one of the crystalline solid electrolyte according to any one of 11 to 15 and the sulfide glass according to 17.

According to the invention, it is possible to provide a method for producing sulfide glass capable of obtaining a crystalline solid electrolyte that is easy to produce.

Further, according to the invention, it is possible to provide sulfide glass that can be crystallized by heating at a wide range of temperatures.

Further, according to the invention, it is possible to provide a crystalline solid electrolyte that is easy to produce.

MODE FOR CARRYING OUT THE INVENTION

[First Invention]

Figure 1:
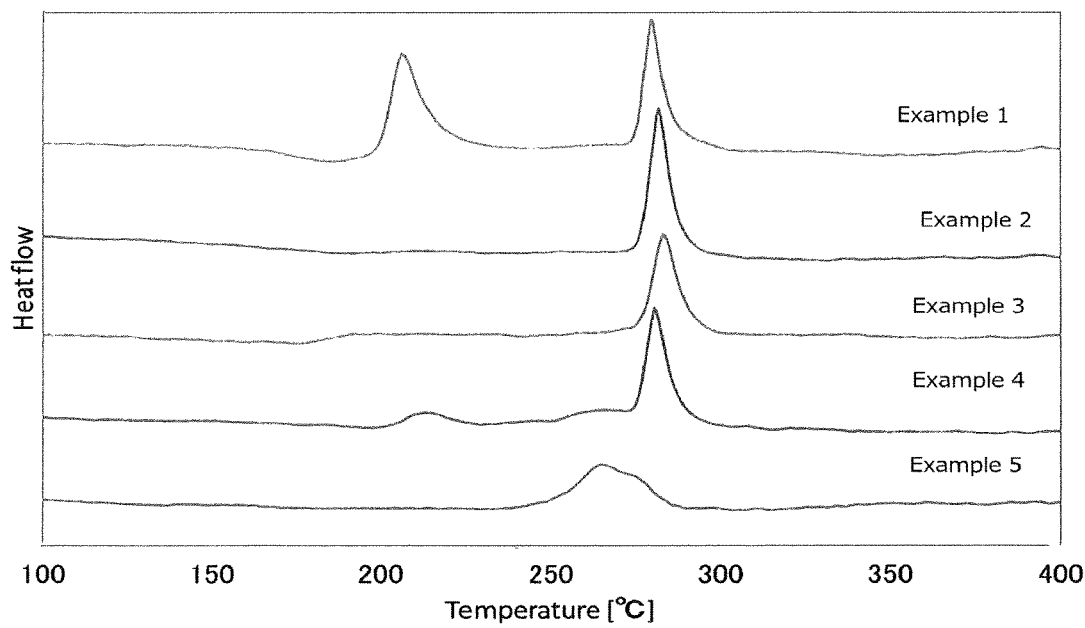
FIG. 1 is a view showing the results of an analysis by differential thermogravimetry of the sulfide glass or the crystalline solid electrolyte produced in Examples 1 to 5.

In the production method for sulfide glass according to the first invention, phosphorus sulfide satisfying the following formula (1) is used as a raw material.

$$100 \times A/B \geq 37 \quad (1)$$

In the formula (1), A is a peak area of peaks appearing at peak positions in a range of 57.2 ppm or more and 58.3 ppm or less, and in a range of 63.0 ppm or more and 64.5 ppm or less in $^{31}$PNMR spectroscopy, and B is the total of peak areas of all peaks measured in $^{31}$PNMR spectroscopy.

In the method for producing sulfide glass according to another aspect of the first invention, phosphorus sulfide satisfying the following formula (2) is used as a raw material:

$$37 \leq 100 \times (A+D)/B \leq 70 \quad (2)$$

In the formula (2), A and B are as defined in the formula (1). D is peak areas of peaks appearing at peak positions in a range of 84.0 ppm or more and 86.0 ppm or less, and in a range of 110 ppm or more and 113 ppm or less in $^{31}$PNMR spectroscopy.

In the method for producing sulfide glass according to another aspect of the first invention, phosphorus sulfide satisfying the following formulas (3) to (5) is used as a raw material:

$$37 \leq 100 \times A/B \leq 60 \quad (3)$$

$$25 \leq 100 \times C/B \leq 60 \quad (4)$$

$$0 \leq 100 \times D/B \leq 10 \quad (5)$$

In the formulas (3) to (5), A, B and D are as defined in the formulas (1) and (2). C is peak areas of peaks appearing at peak positions in a range of 56.6 ppm or more and 57.1 ppm or less in $^{31}$PNMR spectroscopy.

It is preferred that the sulfide glass of the first invention be obtained by using the phosphorus sulfide satisfying the above formulas (1) and (2) as a raw material, and it is more preferred that the sulfide glass of the first invention be obtained by using the phosphorus sulfide satisfying the above formulas (1) to (5) as a raw material.

Further, in the method for producing the sulfide glass of the first invention, it is further preferred that the phosphorus sulfide satisfying the following formula (6) be used as a raw material.

$$0.1 \leq 100 \times D/B \leq 10 \quad (6)$$

In the formula (6), B and D are as defined in the above formulas (1) to (5).

In the method for producing a crystalline solid electrolyte of the first invention, the sulfide glass produced by the method for producing sulfide glass of the first invention is heated.

It is preferred that the method for producing a crystalline solid electrolyte of the first invention satisfy the following formulas (7) and (8):

$$Tc1-18 \leq T \leq Tc1+150 \quad (7)$$

$$T<Tc2 \quad (8)$$

wherein in the formulas, T is a heating temperature (° C., and hereinafter, in the present specification, the temperature is expressed by ° C., unless otherwise indicated); Tc1 is the temperature of an exothermic peak that appears for the first time when sulfide glass is subjected to differential thermogravimetry in a dry nitrogen atmosphere at a temperature-elevating rate of 10° C./min from 20° C. to 600° C., and Tc2 is the temperature of an exothermic peak that appears subsequent to the appearance of an exothermic peak of which the temperature is Tc1.

In the method for producing a crystalline solid electrolyte of the first invention, by producing sulfide glass by using specific phosphorus sulfide as a raw material, the temperature range for crystallization can be broadened.

When mass-producing a crystalline solid electrolyte, it becomes difficult to heat sulfide glass uniformly. In the method for producing a crystalline solid electrolyte of the first invention, since the temperature range in which a crystalline solid electrolyte can be obtained is broad, even if slight un-uniform heating is conducted when heating, it is possible to mass produce stably a crystalline solid electrolyte.

In the method for producing a crystalline solid electrolyte of the first invention, the temperature range represented by the formula (7) is preferably a temperature range indicated by the following formula (7'):

$$Tc1 \leq T \leq Tc1+110 \quad (7')$$

In the method for producing a crystalline solid electrolyte of the first invention, it is preferred that the condition represented by the formula (8) be the condition indicated by the following formula (8'):

$$T<Tc2-45 \quad (8')$$

An explanation will be given below on raw materials, conditions or the like of the method for producing sulfide glass of the first invention and the method for producing crystalline solid electrolyte of the first invention.

In the present specification, the "crystalline solid electrolyte" means a solid electrolyte for which, in X-ray diffractometry, peaks other than peaks derived from raw materials of a crystalline solid electrolyte are observed, and the observed peaks are peaks derived from a crystal structure that develops ionic conductivity. However, it is unclear whether the crystal structure that develops the above-mentioned peaks is a single crystal structure or plural crystal structures. There may be both cases where the crystal structure is a single crystal structure or plural crystal structures.

Presence or absence of peaks derived from raw materials of the crystalline solid electrolyte does not matter, but it is preferable that the peaks derived from the raw materials be small, and it is more preferable that no peaks derived from the raw materials appear. The fact that there are peaks derived from the raw materials indicates that the raw materials remain unreacted, and depending on the kind of raw materials, it may lower the ionic conductivity of the crystalline solid electrolyte.

The "sulfide glass" shows a halo pattern in which, in X-ray diffractometry, an X-ray diffraction pattern does not substantially show peaks other than peaks derived from raw materials. Here, although presence or absence of peaks derived from raw materials of glass sulfide does not matter, it is preferred that the intensity of peaks derived from the raw materials be small, and it is more preferable that no peaks derived from the raw materials appear. Sulfide glass does not necessarily have ionic conductivity, but it is preferred that sulfide glass have ionic conductivity. The reason therefor is as follows. Normally, the crystallization degree of crystalline solid electrolyte is not 100%, and it contains sulfide glass components. The higher the ionic conductivity of sulfide glass is, the higher the ionic conductivity of a crystalline solid electrolyte produced by using the sulfide glass.

[Phosphorus Sulfide]

Phosphorus sulfide is each compound that comprises a sulfur element and a phosphorus element (e.g. $P_4S_{10}$, $P_4S_9$, $P_4S_7$) or is two or more compounds that each comprises a sulfur element and a phosphorus element (e.g. phosphorus sulfide that comprises $P_4S_{10}$, $P_4S_9$ and $P_4S_7$).

Here, as for $P_4S_{10}$, $P_4S_9$, $P_4S_7$, they can be specified in $^{31}$PNMR spectroscopy as follows. $P_4S_9$ can be specified by peaks of which the peak positions appear in a range of 57.2 ppm or more and 58.3 ppm or less and in a range of 63.0 ppm or more and 64.5 ppm or less in $^{31}$PNMR spectroscopy. $P_4S_{10}$ can be specified by peaks of which the peak positions appear in a range of 56.6 ppm or more and 57.1 ppm or less. $P_4S_7$ can be specified by peaks of which the peak positions appear in a range of 84.0 ppm or more and 86.0 ppm or less and in a range of 110 ppm or more and 113 ppm or less.

The definitions of A, B, C and D mentioned later are as given in the above formulas (1) to (5).

In the method for producing sulfide glass of the first invention and in the method for producing a crystalline solid electrolyte of the first invention, phosphorus sulfide satisfying the requirement that "100×A/B" is 37.0 or more is used as a raw material. Preferably, phosphorus sulfide satisfying the requirement that "100×A/B" is 38.0 or more is used. Phosphorus sulfide satisfying requirement that "100×A/B" is 40.0 or more, 42.0 or more, may be used.

The upper limit of the "100×A/B" that is the requirement that is satisfied or may preferably be satisfied by phosphorus sulfide is not particularly restricted, but for example, the upper limit can be 99, 95 or 90.

Phosphorus sulfide satisfying the requirement that "100×C/B" is 25 or more and 60 or less, the requirement that "100×A/B" is 37 or more and 60 or less and the requirement that "100×D/B" is 0 or more and 10 or less may be used.

In the method for producing sulfide glass or the method for producing a crystalline solid electrolyte of the first invention, when phosphorus sulfide used satisfies the requirement that "100×D/B"≥0, said phosphorus sulfide is preferably phosphorus sulfide that satisfies the requirements that "100×C/B" is 25 or more and 60 or less, satisfies the requirements that "100×A/B" is 37 or more and 60 or less and satisfies the requirements that "100×D/B" is 0 or more and 10 or less. Said phosphorus sulfide is more preferably phosphorus sulfide that satisfies the requirement that "100×C/B" is 30 or more and 55 or less, satisfies the requirement that "100×A/B" is 37 or more and 55 or less, and satisfies the requirement that "100×D/B" is 0 or more and 6 or less. Said phosphorus sulfide is further preferably phosphorus sulfide that satisfies the requirement that "100×C/B" is 35 or more and 55 or less, the requirement that "100×A/B" is 38 or more and 50 or less and the requirement that "100×D/B" is 0 or more and 4 or less.

Further, phosphorus sulfide may be phosphorus sulfide that satisfies "100×A/B" of 42 or more and 50 or less, and satisfies "100×D/B" of 0 or more and 4 or less.

In the above, if the phosphorus sulfide used satisfies "100×D/B"≥0, said phosphorus sulfide preferably satisfies the following formula (10), more preferably satisfies the following formula (11), and further preferably satisfies the following formula (12):

$$37 \leq X+Y \leq 70 \tag{10}$$

$$37 \leq X+Y \leq 61 \tag{11}$$

$$38 \leq X+Y \leq 54 \tag{12}$$

wherein in the formulas, X is "100×A/B" in the above-mentioned phosphorus sulfide and Y is "100×D/B" in the above-mentioned phosphorus sulfide.

The above-mentioned phosphorus sulfide may comprise other components than $P_4S_7$, $P_4S_9$ and $P_4S_7$. As the other components, phosphorus polysulfide can be given, for example.

As for the other components, the amount ratio thereof satisfies the requirement that "100×E/B" is 0 or more and 35 or less, more preferably 0 or more and 30 or less, and further preferably 0 or more and 10 or less.

Here, E is the total of peak areas of peaks that appear in a range of smaller than 56.6 ppm, larger than 57.1 ppm, smaller than 57.2 ppm, larger than 58.3 ppm, smaller than 63.0 ppm, larger than 64.5 ppm, smaller than 84.0 ppm, larger than 86.0 ppm, smaller than 110 ppm, and larger than 113 ppm in $^{31}$PNMR spectroscopy.

B is as defined in the above formula (1).

In the method for producing a crystalline solid electrolyte of the invention, the phosphorus sulfide used satisfies the requirement that "100×D/B" is 0.1 or more and 10 or less.

When phosphorus sulfide used satisfies the requirement that "100×D/B">0, said phosphorus sulfide is preferably phosphorus sulfide that satisfies the requirements that "100×C/B" is 25 or more and 60 or less, satisfies the requirements that "100×A/B" is 37 or more and 60 or less and satisfies the requirements that "100×D/B" is 0.1 or more and 10 or less. Said phosphorus sulfide is more preferably phosphorus sulfide that satisfies the requirement that "100×C/B" is 35 or more and 55 or less, satisfies the requirement that "100×A/B" is 37 or more and 55 or less, and satisfies the requirement that "100×D/B" is 0.5 or more and 6 or less. Said phosphorus sulfide is further preferably phosphorus sulfide that satisfies the requirement that "100×C/B" is 35 or more and 55 or less, satisfies the requirement that "100×A/B" is 38 or more and 50 or less and satisfies the requirement that "100×D/B" is 1 or more and 4 or less.

Further, phosphorus sulfide may be phosphorus sulfide that satisfies "100×A/B" of 42 or more and 50 or less, and satisfies "100×D/B" of 1 or more and 4 or less.

In the above, the phosphorus sulfide that comprises $P_4S_7$ preferably satisfies the following formula (10), more preferably satisfies the following formula (11), and further preferably satisfies the following formula (12):

$$37 \leq X+Y \leq 70 \tag{10}$$

$$37 \leq X+Y \leq 61 \tag{11}$$

$$38 \leq X+Y \leq 54 \tag{12}$$

wherein in the formulas, X is "100×A/B" in the above-mentioned phosphorus sulfide and Y is "100×D/B" in the above-mentioned phosphorus sulfide.

That is, X=100×A/B, Y=100×D/B

The above-mentioned phosphorus sulfide may comprise other components than $P_4S_7$, $P_4S_9$ and $P_4S_7$. As the other components, phosphorus polysulfide can be given, for example.

As for the other components, they satisfy the requirement of "100×E/B" of preferably 0 or more and 35 or less, more preferably 0 or more and 30 or less, and further preferably 0 or more and 10 or less.

$P_4S_9$ is divided into α-type $P_4S_9$ and β-type $P_4S_9$. In the production method of the invention, both can be used.

α-type $P_4S_9$ and β-type $P_4S_9$ differ in molecular structure. α-type $P_4S_9$ has a structure in which one S of P=S bonds is deficient in a $P_4S_{10}$ structure, and β-type $P_4S_9$ is a structure in which one S of P—S—P bonds is deficient in a $P_4S_{10}$ structure. These can be judged from the peak position in XRD.

$P_4S_9$ is a molecule in which part of the structure of phosphorus pentasulfide (molecular formula: $P_4S_{10}$) is deficient. The commercially-available phosphorus pentasulfide has a smaller $P_4S_9$ content.

The phosphorus sulfide satisfying the requirement that "100×A/B" is 37.0 or more may be produced by subjecting phosphorus pentasulfide, i.e. phosphorus pentasulfide including $P_4S_9$, to the following treatment. Specifically, said phosphorus pentasulfide is obtained by the Soxhlet extraction method in which carbon disulfide is used as a solvent.

The Soxhlet extraction method is a commonly-used extraction method for extracting a target component from a solid. That is, the flask at the lowermost position that contains the solvent is heated to allow the solvent to be evaporated, and droplets condensed in a cooler at the uppermost position are dripped onto cylindrical filter paper at the intermediate position that contains a sample, and the target component is dissolved therein and is allowed it to be flown into the flask later. By extracting this for a predetermined period of time (hereinafter referred to as "extraction time") with a certain cycle (hereinafter referred to as "extraction cycle"), the target component is concentrated in the solvent in the flask.

More specifically, in the Soxhlet extraction method in which carbon disulfide is used as a solvent, extraction is conducted with an extraction cycle of 2 times or more and 10 times of less, preferably 3 times or more and 9 times or less, for example, 4 times to 5 times, per hour, for 1 hour or longer and 48 hours or shorter, preferably 2 hours or longer and 48 hours or shorter (24 hours, for example).

The resulting extract is evaporated to dryness and then the volatile matters remaining in the extract are removed under vacuum (less than 1 Torr or less than about 130 Pa, ordinary temperature). As a result, phosphorus sulfide satisfying the requirement that "100×A/B" is 37.0 or more can be obtained.

It is preferred that the water content of the carbon disulfide as the solvent be 100 ppm or less.

For example, 25 g of phosphorus pentasulfide is extracted by the Soxhlet extraction method in which carbon disulfide is used as a solvent for 24 hours with an extraction cycle of 4 to 5 times per hour.

The resulting extract is evaporated to dryness and then the volatile matters remaining in the extract are removed under vacuum (less than 1 Torr or less than about 130 Pa, ordinary temperature). As a result, phosphorus sulfide satisfying the requirement that "100×A/B" is 37.0 or more can be obtained.

The phosphorus sulfide used as a raw material preferably comprises $P_4S_{10}$. The "100×D/B" of the phosphorus sulfide is preferably 60.0 or less, more preferably 58.0 or less, and further preferably 55.0 or less. It may satisfy the requirement that "100×D/B" is 50.0 or less, 45.0 or less, 40.0 or less.

The phosphorus sulfide used as a raw material preferably comprises $P_4S_7$.

The phosphorus sulfide may satisfy the requirement that "100×(A+D)/B" is 40.0 or more and 45.0 or more.

The phosphorus sulfide only has to satisfy the requirement that "100×A/B" is 37.0 or more, and may further comprise $P_4S_{10}$ and/or $P_4S_7$. It may consist of $P_4S_9$, $P_4S_{10}$ and $P_4S_7$. The phosphorus sulfide may satisfy the requirement that "100×(A+C+D)/B" is 85 or more, 90 or more and 95 or more.

The values of A to E mentioned above can be calculated from the results of the $^{31}$PNMR spectroscopy. The measurement conditions are as follows.

Here, the value measured is a peak area of each peak, and the values of A to E can be obtained by the above-mentioned method.

Solution preparation: 7 ml of carbon disulfide (anhydrous, manufactured by Sigma-Aldrich Co., LLC) was added to 20 mg of a sample to allow the sample to be completely dissolved therein. Further, 1 ml of benzene-d6 (99.6%, manufactured by ISOTEC Co., Ltd.) was added thereto, followed by stirring, and 0.7 ml of the resultant was filled in an NMR sample tube.

Apparatus: ECA-500 NMR apparatus manufactured by JEOL RESONANCE Inc.

Nuclei observed: $^{31}$P

Observed frequency: 200.43 MHz

Measurement temperature: Room temperature

Pulse sequence: Single pulse (30° pulse is used)

90° pulse width: 13.3 µs

Waiting time until next pulse application after FID measurement: 20 s

Cumulated number: 2048

In the above-mentioned $^{31}$PNMR spectroscopy, a chemical shift is obtained by using a 85% deutrium solution of phosphoric acid (chemical shift 0 ppm) as an external standard.

[Lithium Sulfide]

It is preferred that the raw materials comprise lithium sulfide.

Hereinbelow, an explanation will be given on lithium sulfide.

No specific restrictions are imposed on lithium sulfide that is used as a raw material. For example, commercially-available lithium sulfide can be used. Further, lithium sulfide that can be produced by a method disclosed in JP-A-H07-330312, JP-A-H09-283156, JP-A-2010-163356 and JP-A-2011-084438 can be used.

In JP-A-2010-163356, lithium hydroxide and hydrogen sulfide are reacted in a hydrocarbon-based organic solvent at 70° C. to 300° C. to produce lithium hydrogen sulfide, and subsequently, hydrogen sulfide is removed from this reaction liquid, whereby lithium sulfide is synthesized, and subsequently, hydrogen sulfide is removed from this reaction liquid, whereby lithium sulfide is synthesized. In JP-A-2011-084438, lithium hydroxide and hydrogen sulfide are reacted in a water solvent at 10° C. to 100° C. to produce lithium hydrogen sulfide, and hydrogen sulfide is removed from the reaction liquid, whereby lithium sulfide is synthesized.

In the method for producing lithium sulfide disclosed in JP-A-H07-330312 and JP-A-H09-283156, the resulting lithium sulfide contains lithium salts of a sulfur oxide, and it is preferred that the lithium sulfide be purified. On the other hand, in the method for producing lithium sulfide disclosed in JP-A-2010-163356, since the resulting lithium sulfide has an extremely small content of lithium salts of a sulfur oxide, etc., it can be used as it is without purification.

When purifying lithium sulfide, as a preferable purification method, a purification method disclosed in WO2005/40039 or the like can be given. The resulting lithium sulfide is purified by washing with an organic solvent at a temperature of 100° C. or higher.

[Lithium Halide]

The raw materials may contain lithium halide. As the lithium halide, LiI, LiBr, LiCl and LiF can be given, for example. Among these, one or two or more may be used.

[Mixing]

As the method for producing sulfide glass by mixing raw materials containing phosphorus sulfide, any of a MM (mechanical milling) method, a melt quenching method, a method in which raw materials are brought into contact in a hydrocarbon-based solvent (WO2009/047977), a method in which bringing raw materials into contact with each other in a hydrocarbon-based solvent and pulverizing and synthesizing are alternately conducted (JP-A-2010-140893), and a method in which pulverizing and synthesizing are conducted after a step in which raw materials are brought into contact with each other in a solvent (PCT/JP2012/005992) can be used.

As for the above-mentioned mixing, mixing may be conducted without using balls or beads, or may be conducted in the presence of balls or beads. It is preferred that mixing be conducted in the presence of balls or beads.

As for the mixing, mixing may be conducted without using a solvent or mixing may be conducted in a solvent.

When a solvent is used, a method is preferable in which the solvent is circulated from a reaction container in which balls or beads are used to a reaction container in which no balls or beads are used.

The above-mentioned solvent may be a polar solvent or a non-polar solvent. As the non-polar solvent, a hydrocarbon solvent can be given. As the hydrocarbon solvent, an aliphatic hydrocarbon solvent and an aromatic hydrocarbon solvent can be given. It is preferred that mixing be conducted in an aromatic hydrocarbon solvent. As the aromatic hydrocarbon solvent, alkylbenzene is preferable. Toluene is preferable as the alkylbenzene.

The temperature at the time of mixing is not particularly restricted. Mixing is conducted at a temperature of 0° C. or higher and 150° C. or lower or 5° C. or higher and 140° C. or lower. When a solvent is used, it is preferred that mixing be conducted at a temperature that is equal to or lower than the boiling point of a solvent.

No specific restrictions are imposed on mixing time. Mixing time is 1 hour or longer and 72 hours or shorter, or 2 hours or longer and 48 hours or shorter, for example.

As for the mixing ratio of lithium sulfide, phosphorus sulfide and lithium halide at the time of mixing, it is preferred that mixing be conducted such that the molar ratio of a lithium element, a phosphorus element and a halogen element becomes 120 to 165:20 to 65:5 to 35. As the mixing ratio, lithium sulfide:phosphorus element:lithium halide=120 to 160:20 to 60:5 to 30, lithium sulfide:phosphorus element:lithium halide=120 to 150:25 to 55:5 to 30, lithium sulfide:phosphorus element:lithium halide=120 to 140:30 to 50:5 to 25, lithium sulfide:phosphorus element: lithium halide=120 to 135:35 to 45:10 to 20 can be given.

The mixing ratio of lithium sulfide and phosphorus sulfide is preferably 85 to 60:15 to 40, and more preferably 85 to 65:15 to 35.

The sulfide-based glass of the first invention may be produced by the above-mentioned method for producing sulfide glass.

The crystalline solid electrolyte of the first invention may be produced by the above-mentioned method for producing a crystalline solid electrolyte.

The sulfide glass of the first invention may satisfy the formula (9).

$$Tc1+45 \leq Tc2 \quad (9)$$

wherein in the formula, Tc1 is the temperature of an exothermic peak that appears for the first time when sulfide glass is subjected to differential thermogravimetry in a dry nitrogen atmosphere at a temperature-elevating rate of 10° C./rain from 20° C. to 600° C., and Tc2 is the temperature of an exothermic peak that appears subsequent to the appearance of an exothermic peak of which the temperature is Tc1.

The sulfide glass of the first invention preferably comprises a sulfur element and a lithium element.

Further, the sulfide glass of the first invention preferably comprises a sulfur element and a lithium element.

In addition, the sulfide glass of the first invention may comprise a sulfur element, a lithium element, a phosphorus element and a halogen element.

It is preferred that the first sulfide glass have ionic conductivity.

Further, it is preferred that the halogen element be bromine or iodine.

It is preferred that the sulfide glass of the first invention satisfy the formula (9').

$$Tc1+50 \leq Tc2 \quad (9')$$

wherein in the formula, Tc1 and Tc2 are as defined in the formula (9).

[Crystalline Solid Electrolyte or Sulfide Glass]

The crystalline solid electrolyte obtained by the production method of the first invention or the sulfide glass of the first invention is a crystalline sulfide solid electrolyte or sulfide glass that comprises Li, P and S.

Further, the crystalline solid electrolyte obtained by the production method of the first invention or the sulfide glass of the first invention may be a crystalline solid electrolyte or sulfide glass that comprises Li, P, S and a halogen.

As specific examples of the crystalline solid electrolyte obtained by the production method of the first invention or the sulfide glass of the first invention, a crystalline solid electrolyte or sulfide glass comprising Li, P and S, a crystalline solid electrolyte or sulfide glass comprising Li, P, S and I, a crystalline solid electrolyte or sulfide glass comprising Li, P, S and Br, a crystalline solid electrolyte or sulfide glass comprising Li, P, S and Cl can be given.

When a halogen element is contained, the molar ratio of the lithium element, the phosphorus element, the sulfur and the halogen element in the crystalline solid electrolyte or the sulfide glass is preferably a lithium element:phosphorus element:sulfur element:halogen element=120 to 165:20 to 75:120 to 250:larger than 0 and 35 or less. As the molar ratio of the lithium element, the phosphorus element, the sulfur element and the halogen element in the crystalline solid electrolyte or the sulfide glass, a lithium element:phosphorus element:sulfur element:halogen element=120 to 160:20 to 70:125 to 240:larger than 0 and 25 or less, 120 to 150:25 to 65:125 to 250:larger than 0 and 25 or less, 120 to 140:28 to 65:125 to 250:larger than 0 and 25 or less can be given, for example.

When no halogen element is contained, the molar ratio of the lithium element, the phosphorus element and the sulfur in the crystalline solid electrolyte or the sulfide glass is preferably a lithium element:phosphorus element:sulfur element=0.1 to 12:1 to 2:0.1 to 9, with 1 to 9:1 to 1.8:3 to 7 being more preferable.

The crystalline solid electrolyte of the first invention or the sulfide glass of the first invention preferably have a composition represented by the following formula (13):

$$Li_aM_bP_cS_dX_e \quad (13)$$

wherein in the formula (13), M is an element selected from B, Zn, Si, Cu, Ga and Ge. X is an element selected from F, I, Br, Cl and At.

a to e are elemental composition ratios, and a:b:c:d:e satisfies 0.1 to 12:0 to 0.2:1 to 2:0.1 to 9:0 to 9.

Preferably, b is 0, and more preferably, the ratio of a, c, d and e (a:c:d:e) is a:c:d:e=1 to 9:1:3 to 7:0 to 6, further preferably, a:c:d:e=1.5 to 4:1:3.25 to 4.5:0 to 5

The crystalline solid electrolyte is a solid electrolyte in which at least part thereof is crystallized.

The glass transition point is a temperature at which atoms and ions can move, and in the glass which is heated to a temperature higher than the glass transition point, diffusion or migration of the structural unit becomes conspicuous. On the other hand, crystallization is a phenomenon in which interstitial rearrangement between atoms occurs due to diffusion or migration of structural units in the glass having a disordered atomic arrangement structure, and the structural units are changed to a crystalline phase through a two-step process of nucleation and crystal growth (an atomic arrangement structure having regularity) (see NEW GLASS, 20 (3) 2005).

From the above, it can be considered that, crystallization occurs at a temperature at which the "structural units can be diffused or moved", i.e., occurs at least in the vicinity of the glass transition point or a temperature higher than the glass transition point. Here, the relationship between the temperature of an exothermic peak (Tc1) that appears for the first time when sulfide glass is subjected to differential thermogravimetry in a dry nitrogen atmosphere at a temperature-elevating rate of 10° C./min from 20° C. to 600° C. and the glass transition point is not clear. The inventors have found that a crystal structure can be obtained when heating the sulfide glass that is produced by using the phosphorus sulfide as a raw material at a temperature range of Tc1−18° C. or higher and Tc1+150° C. or lower. Here, it can be assumed that the glass transition point and Tc1 are temperatures that are close to each other. Further, the heating temperature at which the crystal structure can be obtained is required to be lower than the temperature of the exothermic peak (Tc2) that appears subsequent to the appearance of an exothermic peak of which the temperature is Tc1 when subjecting glass sulfide to differential thermogravimetry from 20° C. to 600° C. at a temperature-elevating rate of 10° C./min.

Figure 7:
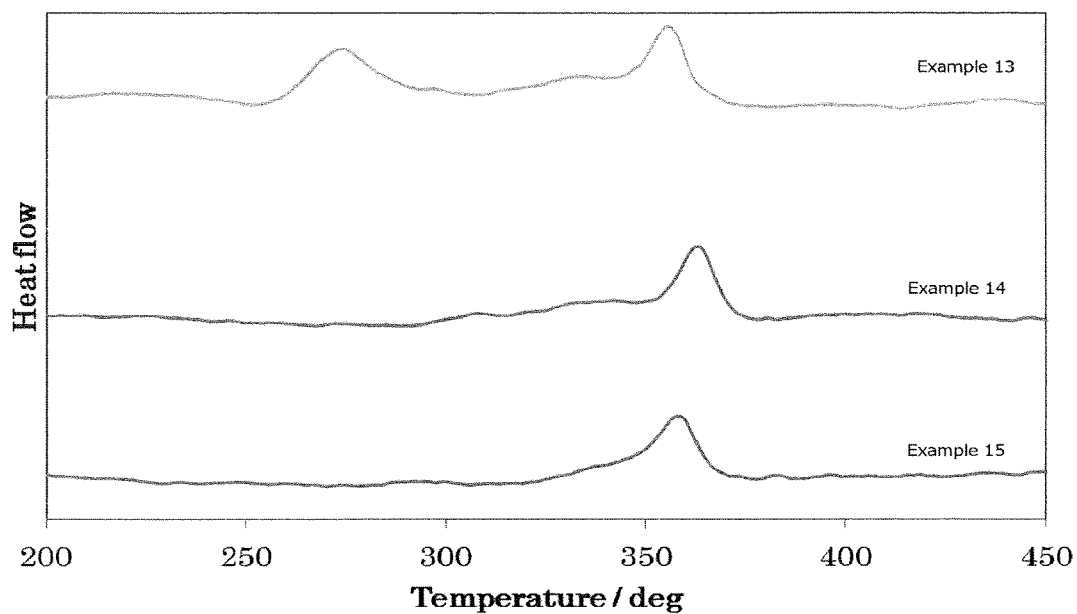
FIG. 7 is a view showing the results of an analysis by differential thermogravimetry of the sulfide glass or the crystalline solid electrolyte produced in Examples 13 to 15.

Here, when sulfide glass (sulfide glass of the first invention, for example) is subjected to differential thermogravimetry from 20° C. to 600° C. in a dry nitrogen atmosphere at a temperature-elevating rate of 10° C./min, a phenomenon similar to a peak may be observed between 20° C. and 400° C. and between Tc1 and Tc2 (see FIG. 7).

A phenomenon similar to a peak may be seen as a peak depending on the view angle. Further, due to a slight amount of heat generation, a phenomenon like a peak may be observed. Here, as for the phenomenon similar to a peak, one that can be seen as a peak depending on the view angle and one that can be seen like a peak due to a slight amount of heat generation are referred to as "peaks or the like" in the following paragraphs.

In such a case, peaks or the like having the highest and the second highest peak-tops among peaks that appear between 20° C. and 400° C. when differential thermogravimetry is conducted from 20° C. to 600° C. at a temperature-elevating rate of 10° C./min are taken as Tc1 and Tc2, respectively. Meanwhile, Tc2 is a temperature higher than Tc1.

It is assumed that a stable phase is started to be mixed with a metastable phase when heating at a temperature that is equal to or higher than Tc2. Since a stable phase does not have a high ionic conductivity, the heating temperature is required to be equal to or lower than Tc2.

From the sulfide glass used in the production method of the first invention, a crystalline solid electrolyte can be obtained in a wide range of heat treatment temperatures. This can be confirmed by the differential thermogravimetry.

When differential thermogravimetry is conducted for the sulfide glass used in the production method of the first invention, two exothermic peaks that are separated from each other are obtained, and the peak temperatures of these two exothermic peaks are sufficiently far from each other, whereby crystallization can be conducted at a wide range of heat treatment temperatures.

As for the intensity of each peak before and after the heat treatment, it is desired that the peak intensity of the exothermic peak that appears at Tc1 be almost zero as compared with the peak intensity before the heat treatment, and it is desired that the peak intensity of the exothermic peak that appears at Tc2 be almost 70% or more as compared with that before the heat treatment. By this, it is possible to form a sufficient amount of a metastable phase.

Heating time is preferably 0.005 minutes or longer and 10 hours or shorter. Further preferably, the heating time is 0.005 minutes or longer and 4 hours or shorter, with 1 minute or longer and 3 hours or shorter being particularly preferable.

No specific restrictions are imposed on the temperature-elevating method. The temperature may be elevated slowly to a prescribed temperature, or the temperature may be quickly elevated to a prescribed temperature.

It is preferred that heating be conducted under an environment of a dew point −40° C. or lower, more preferably a dew point −60° C. or lower. The atmospheric pressure at the time of heating may be ordinary pressure or reduced pressure. The atmosphere may be air or an inert atmosphere.

The crystalline solid electrolyte obtained by the production method of the first invention comprises one or more of the following crystal structures.

$Li_3PS_4$ crystal structure
$Li_4P_2S_6$ crystal structure
$Li_7PS_6$ crystal structure
$Li_7P_3S_{11}$ crystal structure
Crystal structure of $Li_{4-x}Ge_{1-x}P_xS_4$-based thio-LISICON regions II and III (see Kanno et al, Journal of The Electrochemical Society, 148(7) A742-746 (2001))
Crystal structure similar to thio-LISICON regions II and III, differ in part in type of elements from the above $Li_{4-x}Ge_{1-x}P_xS_4$-based thio-LISICON regions II and III (see Solid Statelonics 177 (2006) 2721 to 2725).

The crystalline solid electrolyte is only required to have one crystal structure, and it may have plural crystal structures. The crystal structure can be confirmed by X-ray diffractometry. As the crystal structure, when a higher ionic conductivity is required, $Li_7P_3S_{11}$ is preferable, and when a higher chemical stability is required, a crystal structure corresponding to the thio-LISICON regions II and III (including crystal structures of thio-LISION regions II and III regions and crystal structures similar to the above-mentioned thio-LISION regions II and III) and a $Li_3PS_4$ crystal structure are preferable.

[Negative Electrode Mix]

A negative electrode mix can be obtained by blending a negative electrode active material with the crystalline solid electrolyte obtained in the production method of the first invention.

As the negative electrode active material, a known material such as a carbon material, a metal material or the like can be used. A composite formed of two or more of these materials can also be used.

As the carbon material, graphite (e.g. artificial graphite), graphite carbon fiber, resin calcined carbon, pyrolytic vapor-grown carbon, coke, mesocarbon microbeads (MCMB), furfuryl alcohol resin calcined carbon, polyacene, pitch type carbon fiber, vapor phase growth carbon fiber, natural graphite, hardly graphitizable carbon or the like can be given.

As the metal material, a metal simple body, an alloy and a metal compound can be given. As the metal simple body, metal silicon, metal tin, metal lithium, metal indium and metal aluminum can be given. As the alloy, an alloy that contains at least one of silicon, tin, lithium, indium and aluminum can be given. As the metal compound, a metal oxide can be given. As examples of the metal oxide, silicon oxide, tin oxide and aluminum oxide can be given, for example.

The blending ratio of the negative electrode active material and the crystalline solid electrolyte is preferably negative electrode active material:crystalline solid electrolyte=95 wt %:5 wt % to 5 wt %:95 wt %, more preferably 90 wt %:10 wt % to 10 wt %:90 wt %, further preferably 85 wt %:15 wt % to 15 wt %:85 wt %.

If the content of the negative electrode active material in the negative electrode mix is too small (the amount of the crystalline solid electrolyte is too large), a desired battery capacity is hard to be obtained. On the other hand, if the content of the negative electrode active material in the negative electrode mix is too large (the amount of the crystalline solid electrolyte is too small), since the lithium ion conductive path is not formed sufficiently, the internal resistance is increased, and as a result, the capacity may be lowered.

The negative electrode mix may further contain a conductive aid.

A conductive aid is a component added to increase the capacity or to enhance the high-rate performance of the negative electrode mix. As specific examples of the conductive aid, highly conductive carbon black such as acetylene black and ketjen black, and metal powder such as Ni powder, Cu powder and Ag powder can be given. Among these, it is preferable to use any of highly conductive carbon black, Ni powder and Cu powder that exhibit excellent conductivity by addition of an extremely small amount.

The content of the conductive aid when the negative electrode mix comprises a conductive aid is preferably 1 to 40 mass %, more preferably 2 to 20 mass %. If the content is too small, an electron conductive network sufficient enough to include the negative electrode active materials cannot be formed, and as a result, the capacity is lowered, and the high-rate performance is significantly lowered. On the other hand, if the content of the conductive aid is too large, the bulk density of the negative electrode mix is lowered, and as a result, the charge and discharge capacity per unit volume of the negative electrode mix tends to be lowered. In addition, the strength of the negative electrode mix tends to be lowered.

In order to allow the negative electrode active material and the crystalline solid electrolyte to be bound to each other closely, the negative electrode active material may further contain a binder.

As the binder, a fluorine-containing resin such as polytetrafluoroethylene (PTFE), vinylidene polyfluoride (PVDF) and fluorine rubber, a thermoplastic resin such as polypropylene and polyethylene, ethylene-propylene-diene rubber (EPDM), sulfonated EPDM, natural butyl rubber or the like can be used singly or in a mixture of two or more. Further, a water dispersion such as a cellulose-based binder or styrene butadiene rubber (SBR) as a water-based binder or the like can also be used.

The negative electrode mix can be produced by mixing the crystalline solid electrolyte and the negative electrode active material and an arbitrary conductive aid and/or a binder.

No specific restrictions are imposed on the mixing method. For example, it is possible to use dry mixing in which mixing is conducted by using a mortar, a ball mill, a bead mill, a jet mill, a planetary ball mill, a vibration ball mill, a sand mill or a cutter mill; and wet mixing in which, after dispersing raw materials in an organic solvent, mixing is conducted by using a mortar, a ball mill, a bead mill, a planetary ball mill, a vibration ball mill, a sand mill or a fil mix, and then the solvent is removed. Among these methods, wet mixing is preferable since negative electrode active material particles are not destroyed.

[Positive Electrode Mix]

A positive electrode mix is obtained by blending a positive electrode active material with the crystalline solid electrolyte obtained by the production method of the first invention.

A positive electrode active material is a material into which lithium ions can be inserted or from which lithium ions can be removed, and a material known as a positive electrode active material in the field of a battery can be used.

As the positive electrode active material, known materials can be used. For example, metal oxides, sulfides or the like can be given. The sulfides include metal sulfides and non-metal sulfides.

Metal oxides are transition metal oxides, for example. Specifically, oxides such as $V_2O_5$, $V_6O_{13}$, $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-Y}Co_YO_2$, $LiCo_{1-Y}Mn_YO_2$, $LiNi_{1-Y}Mn_YO_2$ ($0≤Y<1$), $Li(Ni_aCo_bMn_c)O_4$ ($0<a<2$, $0<c<2$, $a+b+c=2$), $LiMn_{2-Z}Ni_ZO_4$, $LiMn_{2-Z}Co_ZO_4$ ($0<Z<2$), $LiCoPO_4$, $LiFePO_4$, $CuO$, $Li(Ni_aCo_bAl_c)O_2$ ($0<a<1$, $0<c<1$, $a+b+c=1$) or the like can be given.

As the metal sulfide, titanium sulfide ($TiS_2$), molybdenum sulfide ($MoS_2$), iron sulfide (FeS, $FeS_2$), copper sulfide (CuS) and nickel sulfide ($Ni_3S_2$) or the like can be given.

In addition, as metal oxides, bismuth oxide ($Bi_2O_3$), bismuth plumbate ($Bi_2Pb_2O_5$) or the like can be given.

As the non-metal sulfide, organic disulfide compounds, carbon sulfide compounds or the like can be given.

In addition to the above, niobium selenide ($NbSe_3$), metal indium and sulfur can be used as the positive electrode material.

The positive electrode mix may further comprise a conductive aid.

The conductive aid is only required to have conductivity. The conductivity of the conductive aid is preferably $1×10^3$ S/cm or more, more preferably $1×10^5$ S/cm or more. As the conductive aid, a material selected from a carbon material, metal powder and a metal compound or a mixture thereof can be given.

As specific examples of the conductive aid, a material comprising at least one element selected from the group consisting of a carbon material, nickel, copper, aluminum, indium, silver, cobalt, magnesium, lithium, chromium, gold, ruthenium, platinum, beryllium, iridium, molybdenum, niobium, osmium, rhodium, tungsten and zinc is preferable. The conductive aid is more preferably a carbon simple body, a carbon material other than a carbon simple body; a metal simple body, a mixture or a compound comprising nickel, copper, silver, cobalt, magnesium, lithium, ruthenium, gold, platinum, niobium, osmium or rhodium, each having a high ionic conductivity.

Specific examples of the carbon materials include carbon black such as ketjen black, acetylene black, denka black, thermal black and channel black, graphite, carbon fibers and active carbon or the like can be given. They may be used singly or in combination of two or more. Among these, acetylene black, denka black and ketjen black having high electron conductivity are preferable.

The blending ratio of the crystalline solid electrolyte and the positive electrode active material in the positive electrode mix, the content of a conductive aid and the method for producing a positive electrode mix are the same as those in the negative electrode mix mentioned above.

[Lithium Ion Battery]

A lithium ion battery is an all-solid battery in which a positive electrode layer, an electrolyte layer and a negative electrode layer are provided in this order, and one or more selected from the positive electrode layer, the electrolyte layer and the negative electrode layer comprises the crystalline solid electrolyte obtained by the production method of the first invention.

Hereinbelow, an explanation will be given on each layer of the lithium ion battery.

(1) Negative Electrode Layer

The negative electrode layer is preferably a layer that comprises the above-mentioned negative electrode mix.

The thickness of the negative electrode layer is preferably 100 nm or more and 5 mm or less, more preferably 1 μm or more and 3 mm or less, with 5 μm or more and 1 mm or less being further preferable.

The negative electrode layer can be produced by a known method. For example, it can be produced by a coating method and an electrostatic method (electrostatic spray method, electrostatic screening method, or the like).

(2) Electrolyte Layer

An electrolyte layer is a layer that comprises a solid electrolyte. No specific restrictions are imposed on the solid electrolyte. A crystalline solid electrolyte produced in the first invention is preferable.

The electrolyte layer may be composed only of a solid electrolyte, but it may further comprise a binder. As the binder, the same binder as that for the negative electrode mix can be used.

The thickness of the electrolyte layer is preferably 0.001 mm or more and 1 mm or less.

The solid electrolyte in the electrolyte layer may be fused. The "fused" means that part of the solid electrolyte particles is dissolved and a dissolved part is integrated with other solid electrolyte particles. Further, the electrolyte layer may be in the form of a plate of the solid electrolyte. It may include a case where part or all of the solid electrolyte particles are dissolved to be in the form of a plate.

The electrolyte layer can be produced by a known method. For example, it can be produced by a coating method, an electrostatic method (electrostatic spray method, electrostatic screen method or the like).

(3) Positive Electrode Layer

A positive electrode layer is a layer that comprises a positive electrode active material, and is preferably a layer formed of the above-mentioned positive electrode mix.

The thickness of the positive electrode layer is preferably 0.01 mm or more and 10 mm or less.

The positive electrode layer can be produced by a known method. For example, it can be produced by a coating method and an electrostatic method (electrostatic spray method, electrostatic screening method, or the like).

(4) Current Collector

It is preferred that the above-mentioned lithium ion battery be further provided with a current collector. For example, the negative electrode current collector is provided on the side opposite to the electrolyte side of the negative electrode, and the positive electrode current collector is provided on the side opposite to the electrolyte side of the positive electrode.

As the current collector, a plate-like or foil-like current collector formed of copper, magnesium, stainless steel, titanium, iron, cobalt, nickel, zinc, aluminum, germanium, indium, lithium or alloys thereof can be used.

The above-mentioned lithium ion battery can be produced by laminating and bonding the above-mentioned members. As the method for bonding, a method in which members are stacked, followed by pressurization and crimping, or a method in which members are passed through two rolls, thereby to conduct pressurization (roll-to-roll method) or the like can be given.

Further, bonding can be conducted with an active material having ionic conductivity or an adhesive material that does not inhibit ionic conductivity being present on the bonding surface.

In bonding, fusion with heating can be conducted within a range that the crystal structure of the solid electrolyte does not change.

Further, the lithium ion battery mentioned above can be produced by forming the above-mentioned members sequentially. The lithium ion battery can be produced by a known method. For example, it can be produced by a coating method, an electrostatic method (electrostatic spray method, electrostatic screening method, or the like).

[Second Invention]

A. Crystalline Solid Electrolyte

The crystalline solid electrolyte of the second invention is characterized in that it comprises as constitutional elements a lithium element, a phosphorus element and a sulfur element, and, in a diffraction pattern obtained by power X-ray diffractometry (CuKα:λ=1.5418 Å), a peak is observed in the following three points (A) to (C):

$$2\theta = 18.9 \pm 0.5 \text{ deg} \quad (A)$$

$$2\theta = 21.5 \pm 0.5 \text{ deg} \quad (B)$$

$$2\theta = 38.6 \pm 0.5 \text{ deg} \quad (C)$$

The peak measured in the powder X-ray diffractometry indicates presence of a specific crystal structure. The crystalline solid electrolyte in the second invention has a crystal structure specified by the above-mentioned peaks (A) to (C). In the second invention, it is possible to obtain a solid electrolyte that can enable the heating temperature range at the time of crystallization to be wide.

In the crystalline solid electrolyte of the second invention, in the diffraction pattern obtained by the powder X-ray diffractometry, the following peaks (D) and (E) are preferably observed.

$$2\theta = 17.6 \pm 0.5 \text{ deg} \quad (D)$$

$$2\theta = 23.5 \pm 0.5 \text{ deg} \quad (E)$$

In particular, preferably, in a diffraction pattern obtained by the powder X-ray diffractometry, the following peak (F) is observed.

$$2\theta = 34.6 \pm 0.5 \text{ deg} \quad (F)$$

Crystal structures may be one or two or more.

As mentioned above, in the present invention, the "crystalline solid electrolyte" means a solid electrolyte for which, in X-ray diffractometry, peaks other than peaks derived from raw materials for the crystalline solid electrolyte are observed, and the observed peaks are peaks derived from the crystal structure that exhibits ionic conductivity. Therefore, it is assumed that the crystalline solid electrolyte of the present invention has a crystal structure that develops a peak at the positions (A) to (C) mentioned above. However, it is unclear whether the crystal structure that develops a peak at the positions (A) to (C) mentioned above has a single crystal structure or plural crystal structures. Both cases are possible where it has a single crystal structure or plural crystal structures.

The crystalline solid electrolyte may have a crystal structure other than crystal structures that develop a peak at positions (A) to (C).

The crystalline solid electrolyte of the second invention comprises a lithium element, a phosphorus element and a sulfur element as essential components. In addition to these elements, B, Zn, Si, Cu, Ga, Ge, F, I, Br, Cl or At may be contained. These elements may be contained singly or in combination.

As for the molar ratio of the lithium element, the phosphorus element, the sulfur element and the halogen element in the crystalline solid electrolyte is preferably lithium element:phosphorus element:sulfur element:halogen element=120 to 165:20 to 75:120 to 250:0 to 35, more preferably 120 to 160:20 to 70:125 to 240:0 to 25, further preferably 120 to 150:25 to 65:125 to 250:0 to 25, with 120 to 140:28 to 65:125 to 250:0 to 25 being further more preferable.

As for the crystalline solid electrolyte of the second invention, if no halogen element is contained, it is preferred that the molar ratio of the lithium element, the phosphorus element and the sulfur element (lithium element:phosphorus element:sulfur element) satisfy 0.1 to 12:1 to 2:0.1 to 9, more preferably 1 to 9:1 to 1.8:3 to 7, with 1.5 to 4:1 to 1.5:3.25 to 4.5 being further preferable.

The crystalline solid electrolyte of the second invention preferably has a composition indicated by the following formula (13):

$$Li_a M_b P_c S_d X_e \quad (13)$$

In the formula (13), M is an element selected from B, Zn, Si, Cu, Ga and Ge. X is an element selected from F, I, Br, Cl and At.

a to e are elemental composition ratios, and a:b:c:d:e satisfies 0.1 to 12:0 to 0.2:1 to 2:0.1 to 9:0 to 9.

Preferably, b is 0. More preferably, the ratio of a, c, d and e (a:c:d:e) is a:c:d:e=1 to 9:1:3 to 7:0 to 6, further preferably, a:c:d:e=1.5 to 4:1:3.25 to 4.5:0 to 5.

The crystalline solid electrolyte of the second invention can be produced by heating the sulfide glass of the second invention mentioned below at a temperature range of 160 to 350° C., for example.

The heating time is preferably 0.005 minutes or longer and 10 hours or shorter. Further preferably, the heating time is 0.005 minutes or longer and 4 hours or shorter, with one minute or longer and 3 hours or shorter being particularly preferable.

No specific restrictions are imposed on the heat-elevating rate. The temperature may be elevated slowly to a prescribed temperature, or the temperature may be quickly elevated to a prescribed temperature.

It is preferred that heating be conducted under an environment of a dew point−40° C. or lower, more preferably a dew point−60° C. or lower. The atmospheric pressure at the time of heating may be ordinary pressure or reduced pressure. The atmosphere may be air or an inert atmosphere.

B. Sulfide Glass

The sulfide glass of the second invention comprises lithium, phosphorus and sulfur as constituent components, and when a heat treatment is conducted every one degree centigrade in a temperature range of 160 to 350° C., the crystalline solid electrolyte can be obtained at least one or more points.

The sulfide glass of the second invention may comprise B, Zn, Si, Cu, Ga, Ge, F, I, Br, Cl or At in addition to a lithium element, a phosphorus element and a sulfur element. These elements may be contained singly or in combination of two or more.

The molar ratio of the lithium element, the phosphorus element, the sulfur element and the halogen element in the sulfide glass is preferably 120 to 165:20 to 75:120 to 250:0 to 35, more preferably 120 to 160:20 to 70:125 to 240:0 to 25, further preferably 120 to 150:25 to 65:125 to 250:0 to 25, and further more preferably 120 to 140:28 to 65:125 to 250:0 to 25.

When no halogen element is contained, the molar ratio of the lithium element, the phosphorus element and the sulfur element or the sulfide glass (lithium element:phosphorus element:sulfur element) is preferably 0.1 to 12:1 to 2:0.1 to 9, more preferably 1 to 9:1 to 1.8:3 to 7, and further preferably 1.5 to 4:1 to 1.5:3.25 to 4.5.

The sulfide glass of the second invention preferably has a composition represented by the following formula (13):

$$Li_a M_b P_c S_d X_e \quad (13)$$

wherein in the formula (13), M is an element selected from B, Zn, Si, Cu, Ga and Ge. X is an element selected from F, I, Br, Cl and At.

a to e are elemental composition ratios, and a:b:c:d:e satisfies 0.1 to 12:0 to 0.2:1 to 2:0.1 to 9:0 to 9.

Preferably, b is 0, and more preferably the ratio of a, c, d and e (a:c:d:e) is a:c:d:e=1 to 9:1:3 to 7:0 to 6, and further preferably a:c:d:e=1.5 to 4:1:3.25 to 4.5:0 to 5.

The sulfide glass of the second invention can be produced by mixing raw materials comprising lithium, phosphorus and sulfur, and if desired, the above-mentioned B, Zn, Si, Cu, Ga, Ge, F, I, Br, Cl or At and by synthesizing the resulting mixture.

As the raw materials of the sulfide glass, Li$_2$S (lithium sulfide), phosphorus sulfide, SiS$_2$ (silicon sulfide), Li$_4$SiO$_4$ (lithium ortho-silicate), Al$_2$S$_3$ (aluminum sulfide), phosphorus simple body (P), sulfur simple body (S), silicon (Si), GeS$_2$ (germanium sulfide), B$_2$S$_3$ (arsenic trisulfide), Li$_3$PO$_4$ (lithium phosphate), Li$_4$GeO$_4$ (lithium germanate), LiBO$_2$ (lithium metaborate), LiAlO$_3$ (lithium aluminate), LiI (lithium iodate), LiBr (lithium bromate) or the like can be used.

Hereinbelow, an explanation will be given on the method for producing sulfide glass in which lithium sulfide and phosphorus sulfide are used as the raw materials.

Since the lithium sulfide is the same as that in the first invention, an explanation is omitted. Phosphorus sulfide is each compound that comprises a sulfur element and a phosphorus element (e.g. P$_4$S$_{10}$, P$_4$S$_9$, P$_4$S$_7$) or is two or more compounds that each comprise a sulfur element and a phosphorus element (e.g. phosphorus sulfide composed of P$_4$S$_{10}$, P$_4$S$_9$ and P$_4$S$_7$).

Since the phosphorus sulfide used in the second invention is the same as that of the first invention, an explanation thereof is omitted.

The method for producing sulfide-based glass using lithium sulfide and phosphorus sulfide mentioned above is the same as that in the first invention, and hence an explanation thereof is omitted.

The sulfide glass of the second invention is capable of obtaining crystalline solid electrolyte that can be crystallized (including partially crystallized) by heating at a wide range of heat treatment temperatures.

Since the crystallization in the second invention is the same as that in the first invention, an explanation is omitted.

C. Electrode Mix

The electrode mix of the second invention comprises a solid electrolyte and an electrode active material. The solid electrolyte comprises at least one of the crystalline solid electrolyte and the sulfide glass of the second invention. Here, the sulfide glass used here have ionic conductivity.

If the negative electrode active material is used as the electrode active material, the negative electrode mix is obtained. On the other hand, when the positive electrode active material is used, the positive electrode mix is obtained.

For other constitutional elements than the solid electrolyte, an explanation will be omitted since they are the same as those of the first invention.

D. Solid Battery

The solid battery of the second invention comprises an electrode that comprises the first solid electrolyte and the electrode active material, and an electrolyte layer that comprises the second solid electrolyte. At least one of the first solid electrolyte and the second solid electrolyte comprises at least one of the crystalline solid electrolyte of the second invention and the sulfide glass.

The sulfide glass used herein has ionic conductivity.

As the solid battery, a lithium ion battery can be given, for example.

An explanation on the solid battery of the second invention is omitted here since it is the same as that of the lithium ion battery of the first invention except that the crystalline solid electrolyte and the glass sulfide of the second invention are used.

EXAMPLES

Hereinbelow, the present invention will be explained in more detail with reference to the Examples.

Production Example 1

[Production of Lithium Sulfide ($Li_2S$)]

Production and purification of lithium sulfide were conducted as follows:

As the non-water soluble medium, 303.8 kg of toluene (manufactured by Sumitomo Corporation) of which the water content became 100 ppm as measured by means of a Karl Fischer Moisture meter by a dehydration treatment was added to a 500 L-stainless-made reaction vessel in a nitrogen flow. Subsequently, 33.8 kg of anhydrous lithium hydroxide (manufactured by Honjo Chemical Corporation) was put, and the temperature was retained at 95° C. while stirring by a Twinstir stirring blade at a stirring rate of 131 rpm.

While blowing hydrogen sulfide (manufactured by Sumitomo Seika Chemicals Co., Ltd.) to the slurry at a supply rate of 100 L/min, the temperature was elevated to 104° C. From the reaction vessel, an azeotropic gas of water and toluene was continuously discharged. This azeotropic gas was dehydrated by condensing in a condenser outside the reaction system. During this period of time, toluene in the same amount as that of the amount of toluene distilled off was continuously suppled, whereby the reaction liquid level was kept at a constant level.

The amount of water in the condensed liquid was gradually decreased, and, after the lapse of 24 hours from the start of introduction of hydrogen sulfide, distillation of water was no longer observed. During the reaction, a state was kept where solids were dispersed and stirred in the toluene, and there was no water content separated from the toluene.

Thereafter, the hydrogen sulfide was changed to nitrogen, and nitrogen was circulated for 1 hour at a flow rate of 100 L/min.

The obtained solid matters were filtered and dried to obtain lithium sulfide as white powder, and the lithium sulfide was subjected to titration analysis (hydrochloric acid titration). The purity of lithium sulfide was 97.9%. As a result of X-ray diffractometry, it was confirmed that no peaks other than those derived from crystal patterns of lithium sulfide were detected.

The specific surface area of the resulting lithium sulfide was measured by the BET method by a nitrogen gas and by using AUTOSORB6. The specific surface area was found to be 16.8 $m^2/g$.

For the obtained lithium sulfide, titration analysis (hydrochloric acid titration) and ion chromatography analysis were conducted. As a result of conducting a gas chromatography analysis or the like for the reacted toluene, it was found that the lithium sulfide contained, as impurities, 0.4 mass % of lithium hydroxide, 0.9 mass % of lithium carbonate, 0.5 mass % of each of sulfur oxides such as lithium sulfite and 0.2 mass % of toluene.

Production Example 2

[Production of Phosphorus Sulfide (Extract 1) Having a Large $P_4S_9$ Content]

As for 25 g of phosphorus pentasulfide as a commercially-available product (manufactured by Thermophos International B.V., Special grade/FS, hereinafter referred to as the "commercially-available phosphorus sulfide"), extraction was conducted for 24 hours with an extraction cycle of 4 to 5 times per hour by the Soxhlet extraction method in which carbon disulfide (manufactured by Sigma Aldrich Co., LLC, Super dehydrated) was used as a solvent. After completion of this extraction, the extract was evaporated to dryness, and then, volatile matters remaining in the extract were removed under vacuum (less than 1 Torr or less than about 130 Pa, ordinary temperature).

As a result of an XRD measurement conducted for the resulting phosphorus sulfide as an extract (Extract 1), peaks attributed to $P_4S_{10}$ and $\alpha$-$P_4S_9$ were observed, and among these peaks, the main peak derived from $\alpha$-$P_4S_9$ was confirmed. It was confirmed that the resulting phosphorus sulfide is phosphorus sulfide of which the main peak of $\alpha$-$P_4S_9$ is large.

As for the resulting phosphorus sulfide (Extract 1), $^{31}$PNMR spectroscopy was conducted under the following conditions to evaluate the phosphorus ratio. Attribution of the peak is shown in Table 1, and the results of evaluation are shown in Table 2. The same evaluation on the phosphorus ratio was conducted for phosphorus sulfide as a commercial product (manufactured by Thermophos International B.V., Special grade/FS) was conducted. The results are shown in Table 2. As mentioned above, the phosphorus ratio is the ratio (%) of the area of each peak relative to the total peak areas.

The solution was prepared as follows:7 ml of carbon disulfide (manufactured by Sigma Aldrich Co., LLC, Super dehydrated) was added to 20 mg of the sample to allow it to be dissolved therein completely. Further, 1 ml of benzene-d6 (manufactured by Isothermal Technology, 99.6 at %) was added, followed by stirring. 0.7 ml thereof was filled in a NMR sample tube.

Apparatus: ECA-500 NMR apparatus (manufactured by JEOL RESONANCE, Inc.)

Observed nuclei: $^{31}$P

Observed frequency: 200.43 MHz

Measured temperature: Room temperature

Pulse sequence: Single pulse (30° pulse is used)

90° pulse width: 11.4 µs

Waiting time until next pulse application after FID measurement: 20 s

Cumulative number: 2048

In the above-mentioned $^{31}$PNMR spectroscopy, the chemical shift was determined by using a 85% deuterium solution of phosphoric acid as an external standard (chemical shift: 0 ppm). The measurement range was from −201 ppm to 201 ppm.

From the results of NMR spectroscopy, the following can be concluded. That is, in general, commercially-available phosphorus pentasulfide includes not only phosphorus pentasulfide represented by a molecular formula $P_4S_{10}$, but also includes other phosphorus sulfides such as $P_4S_9$. As a whole, phosphorus sulfides of which the ratio of the phosphorus element and the sulfur element is 2:5 are named as phosphorus pentasulfide.

In the present invention, the amount (mol) of phosphorus sulfide was calculated in terms of molecular amount of $P_2S_5$.

Production Example 3

[Production of Phosphorus Sulfide with a Small $P_4S_9$ Content (Remaining Product 1)]

As for 25 g of phosphorus pentasulfide (manufactured by Thermophos International B.V., Special grade/FS), extraction was conducted for 24 hours with an extraction cycle of 4 to 5 times per hour by the Soxhlet extraction method in which carbon disulfide (manufactured by Sigma Aldrich Co., LLC, Super dehydrated) was used as a solvent. After completion of this extraction, the matters remaining in the cylindrical filter paper were evaporated to dryness, and then, volatile matters remaining in the remaining product were removed under vacuum (less than 1 Torr or less than about 130 Pa, normal temperature).

As a result of an XRD measurement conducted on the resulting product (Remaining Product 1), peaks attributed to $P_4S_{10}$ and α-$P_4S_9$ were observed. Among these peaks, it was confirmed that the product was phosphorus sulfide of which the main peak of $P_4S_{10}$ is large.

For the obtained phosphorus sulfide (Remaining Product 1), the measurement of a $^{31}$PNMR spectrum was conducted in the same manner as in Production Example 2. The results are shown in Table 2.

Production Example 4

[Production of Phosphorus Sulfide Having a Large $P_4S_9$ Content (Extract 2)]

About 30 g of commercially-available phosphorus pentasulfide (Special grade/FS manufactured by Thermophos International B.V.) was extracted with an extraction cycle of 4 to 5 times per hour by a Soxhlet extraction method in which carbon disulfide (manufactured by Sigma Aldrich Co., LLC, Super dehydrated) was used as a solvent for 25 hours. Upon completion of this extraction step, the extract obtained was evaporated to dryness and then the volatile matters remaining in the extract were removed under vacuum (less than 1 Torr or less than about 130 Pa, ambient temperature).

As a result of an XRD measurement conducted for the resulting phosphorus sulfide as an extract (extract 2), peaks attributed to $P_4S_{10}$ and α-$P_4S_9$ were observed. It was confirmed that the product was phosphorus sulfide of which the main peak of α-$P_4S_9$ is large among these peaks.

For the obtained phosphorus sulfide (extract 2), $^{31}$PNMR spectroscopy was conducted in the same manner as in Production Example 2. The results are shown in Table 2.

Production Example 5

[Production of Phosphorus Sulfide (Remaining Product 2) Having a Small $P_4S_9$ Content]

About 30 g of phosphorus pentasulfide (Special grade/FS manufactured by Thermophos International B.V.) was extracted with an extraction cycle of 4 to 5 times per hour by the Soxhlet extraction method using carbon disulfide (manufactured by Sigma Aldrich Co., LLC, Super hydrated) as a solvent for 25 hours. Upon completion of this extraction step, matters remaining in the cylindrical paper were evaporated to dryness and then the volatile matters remaining in the Remaining Product were removed under vacuum (less than 1 Torr or less than about 130 Pa, ordinary temperature).

As a result of an XRD measurement conducted on the resulting product (Remaining Product 2), peaks attributed to $P_4S_{10}$ and α-$P_4S_9$ were observed. It was confirmed that the product was phosphorus sulfide of which the main peak of $P_4S_{10}$ is large.

For the obtained phosphorus sulfide (Remaining Product 2), the measurement of a $^{31}$PNMR spectroscopy was conducted in the same manner as in Production Example 2. The results are shown in Table 2.

TABLE 1

| Peak position [ppm] | Attribution |
| --- | --- |
| 56.6-57.1 | $P_4S_{10}$ |
| 57.2-58.3, 63-64.5 | $P_4S_9$ |
| 84-86, 110-113 | $P_4S_7$ |
| 18-20, 46-49, 79-81, 90-92 | Phosphorus Poly-Sulfides |
| Other than those given above | unknown |

TABLE 2

| | | Production Example 2 (Extract 1) | Production Example 3 (Remaining product 1) | Production Example 4 (Extract 2) | Production Example 5 (Remaining product 2) | Commercial product |
| --- | --- | --- | --- | --- | --- | --- |
| $P_4S_{10}$ | 100 × C/B | 53.1 | 68.8 | 39.7 | 59.2 | 51.8 |
| $P_4S_9$ | 100 × A/B | 38.9 | 24.8 | 45.6 | 31.4 | 35.6 |
| $P_4S_7$ | 100 × D/B | 1.3 | 0.0 | 2.0 | 0.0 | 0.0 |
| $P_4S_9 + P_4S_7$ | 100 × (A + D)/B | 40.2 | 24.8 | 47.6 | 31.4 | 35.6 |
| Phosphorus Poly-Sulfides + Unknown | 100 × E/B | 6.7 | 6.4 | 12.7 | 9.4 | 12.6 |

All of the units is a phosphorus ratio [%]

Example 1

[Raw Material Ratio: Lithium Sulfide/Phosphorus Sulfide (Extract 1)/LiBr=63.75/21.25/15:MM (Dry) Method]

(1) Synthesis of Sulfide Glass

The lithium sulfide produced in the Production Example 1, the phosphorus sulfide (extract 1) produced in the Production Example 2 and LiBr (manufactured by Honjo Chemical Corporation) were used as starting materials. About 1 g of a mixture obtained by mixing them such that the molar ratio thereof became lithium sulfide:phosphorus sulfide:LiBr=63.75:21.25:15 and 10 zirconia balls each having a diameter of 10 mm were put in an aluminum pot (45 mL) of a planetary ball mill (Model P-7, manufactured by Fritsch Japan), and the pot was completely sealed. The inside of the pot was allowed to be an argon atmosphere. Mechanical milling was conducted for 40 hours with the rotation speed of the planetary ball mill being 370 rpm, whereby sulfide glass was synthesized.

For the obtained sulfide glass, differential thermogravimetry was conducted.

Differential thermogravimetry was conducted in a dry nitrogen atmosphere at a temperature-elevating ratio of 10° C./min from 20 to 600° C. Measurement was conducted by using a differential thermogravimetric apparatus (TGA/DSC1, manufactured by Mettler Toledo International Inc.) with about 20 mg of the sulfide glass.

FIG. 1 shows the results of the differential thermogravimetry. The temperature Tc1 of the exothermic peak that appears for the first time in the differential thermogravimetry, the temperature Tc2 of the exothermic peak that appears subsequent to Tc1, and difference in temperature ΔT between Tc1 and Tc2 are shown in Table 3.

TABLE 3

| | Tc1 (° C.) | Tc2 (° C.) | ΔT (° C.) | Heat treatment temperature (° C.) | Hc1/Hc1p | Hc2/Hc2p |
|---|---|---|---|---|---|---|
| Example 1 | 206 | 280 | 73 | None | — | — |
| Example 2 | — | — | — | 206 | 0 | 0.95 |
| Example 3 | — | — | — | 203 | 0 | 0.90 |
| Example 4 | — | — | — | 201 | 0.1 | 0.84 |
| Example 5 | — | — | — | 225 | 0 | 0.76 |
| Comp. Ex. 1 | 205 | 242 | 37 | None | — | — |
| Comp. Ex. 2 | — | — | — | 205 | 0 | 0.64 |
| Comp. Ex. 3 | — | — | — | 202 | 0 | 0.74 |
| Comp. Ex. 4 | — | — | — | 200 | 0 | 0.79 |
| Comp. Ex. 5 | — | — | — | 225 | 0 | 0 |
| Example 6 | 209 | 260 | 52 | None | — | — |
| Example 7 | — | — | — | 204 | 0 | 0.88 |
| Example 8 | — | — | — | 206 | 0 | 0.82 |
| Example 9 | — | — | — | 209 | 0 | 0.94 |
| Example 10 | — | — | — | 212 | 0 | 0.81 |
| Example 11 | — | — | — | 214 | 0 | 0.91 |
| Example 12 | — | — | — | 215 | 0 | 0.77 |
| Comp. Ex. 6 | 198 | 236 | 39 | None | — | — |
| Comp. Ex. 7 | — | — | — | 193 | 0 | 0.77 |
| Comp. Ex. 8 | — | — | — | 195 | 0 | 0.73 |
| Comp. Ex. 9 | — | — | — | 198 | 0 | 0.49 |
| Comp. Ex. 10 | — | — | — | 201 | 0 | 0.13 |
| Comp. Ex. 11 | — | — | — | 203 | 0 | 0 |
| Comp. Ex. 12 | — | — | — | 215 | 0 | 0 |
| Comp. Ex. 13 | 207 | 246 | 39 | None | — | — |
| Comp. Ex. 14 | 201 | 243 | 41 | None | — | — |
| Example 13 | 274 | 355 | 81 | None | — | — |
| Example 14 | — | — | — | 274 | 0 | 0.80 |
| Example 15 | — | — | — | 300 | 0 | 0.61 |
| Comp. Ex. 15 | 235 | None | — | None | — | — |
| Comp. Ex. 16 | — | — | — | 230 | 0 | — |
| Comp. Ex. 17 | — | — | — | 235 | 0 | — |
| Comp. Ex. 18 | — | — | — | 240 | 0 | — |

Comparative Example 1

[Lithium Sulfide/Phosphorus Sulfide (Remaining Product 1)/LiBr=63.75/21.25/15:MM (Dry) Method]

Figure 2:
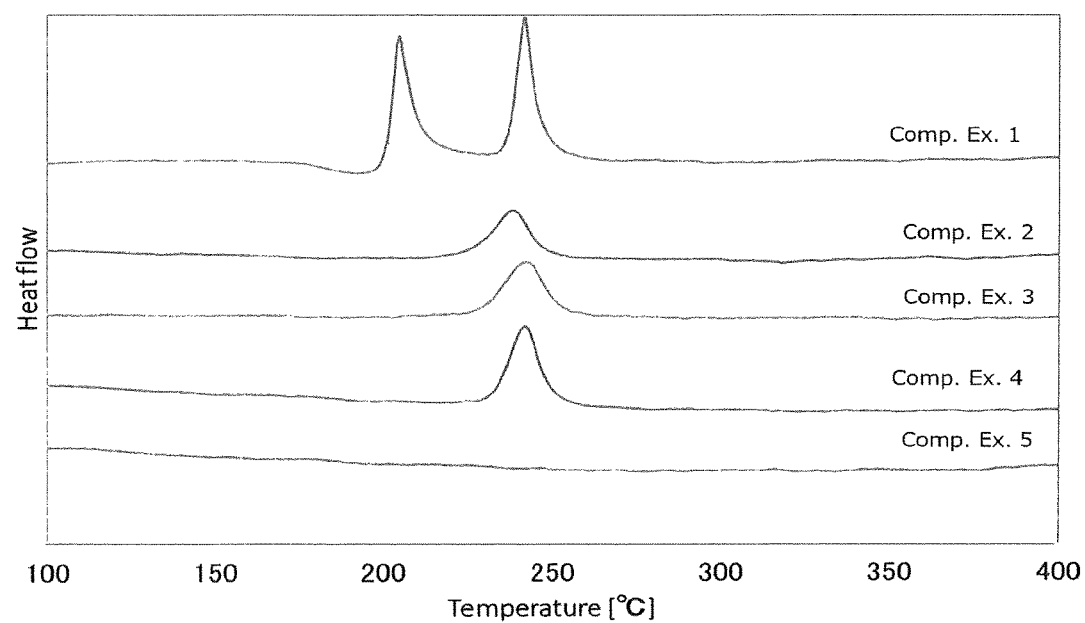
FIG. 2 is a view showing the results of an analysis by differential thermogravimetry of the sulfide glass or the crystalline solid electrolyte produced in Comparative Examples 1 to 5.

Sulfide glass was produced and evaluated in the same manner as in Example 1, except that the phosphorus sulfide used as a raw material was changed to the phosphorus sulfide (Remaining Product 1) produced in Production Example 3. The results are shown in FIG. 2 and Table 3.

Example 2

[Raw Material Ratio: Lithium Sulfide/Phosphorus Sulfide (Extract 1)/LiBr=63.75/21.25/15:MM (Dry) Method–206° C. (Peak Top Temperature) Heat-Treated Crystalline Solid Electrolyte]

0.7 g of the sulfide glass synthesized in Example 1 was put in a 50 ml-Schlenk bottle in an argon atmosphere. The Schlenk bottle was put in an oil bath that had been heated to 206° C. in advance, and subjected to a heat treatment for 2 hours, whereby a crystalline solid electrolyte was obtained. For the resulting crystalline solid electrolyte, differential thermogravimetry was conducted in the same manner as in Example 1. The results are shown in FIG. 1 and Table 3.

As a result of the heat treatment, it can be understood that the peak that appears at Tc1 disappears and only a peak that appears at Tc2 could be seen. In the differential thermal analysis, when the integrated intensity of a peak that appears at Tc1 before the heat treatment was taken as Hc1p, and the integrated intensity of a peak that appears at Tc2 before the heat treatment was taken as Hc2p and the integrated intensity of a peak that appears at Tc1 after the heat treatment was taken as Hc1 and the integrated intensity of a peak that appears at Tc2 after the heat treatment was taken as Hc2, the peak intensity ratio (Hc1/Hc1p and Hc2/Hc2p) before and after the heat treatment is shown in Table 3.

In the differential thermal analysis results, the integration of the peak values was calculated by analysis software attached to the apparatus. Specifically, after standardizing the curve of the differential thermal analysis results by weight, the integration range was specified and integration was conducted. As a baseline, one obtained by approximating a range of 75 to 300° C. with a straight line, followed by extrapolation, was used. However, for those judged to have a curve due to a crystallization peak or a glass transition point in a range of 75 to 300° C., a straight line was approximated within a range excluding the range, whereby a baseline was defined. As for the range of integration, in a range of ±20° C. of the peak top, a range from a point at which the absolute value of (Heat flow at each temperature—Baseline) becomes the smallest at the low-temperature side from the peak top to a point at which the absolute value of (Heat flow at each temperature—Baseline) becomes the smallest at the high-temperature side. In this range, the integrated intensity was calculated by the analysis software. As a result, the peak positions Tc1, Tc2, the peak integrated intensities Hc1, Hc2, Hc1p and Hc2p were obtained.

Example 3

[Raw Material Ratio: Lithium Sulfide/Phosphorus Sulfide (Extract 1)/LiBr=63.75/21.25/15:MM (Dry) Method–203° C. (Peak Top Temperature–3° C.) Heat-Treated Crystalline Solid Electrolyte]

The crystalline solid electrolyte was produced and evaluated in the same manner as in Example 2 except that the heat treatment temperature was changed to 203° C. The results are shown in FIG. 1 and Table 3.

Example 4

[Raw Material Ratio: Lithium Sulfide/Phosphorus Sulfide (Extract 1)/LiBr=63.75/21.25/15:MM (Dry) Method–201° C. (Peak Top Temperature–5° C.) Heat-Treated Crystalline Solid Electrolyte]

The crystalline solid electrolyte was produced and evaluated in the same manner as in Example 2 except that the heat treatment temperature was changed to 201° C. The results are shown in FIG. 1 and Table 3.

Example 5

[Raw Material Ratio: Lithium Sulfide/Phosphorus Sulfide (Extract 1)/LiBr=63.75/21.25/15:MM (Dry) Method–225° C. (between Tc1 and Tc2) Heat-Treated Crystalline Solid Electrolyte]

The crystalline solid electrolyte was produced and evaluated in the same manner as in Example 2 except that the heat treatment temperature was changed to 225° C. The results are shown in FIG. 1 and Table 3.

Comparative Example 2

[Raw Material Ratio: Lithium Sulfide/Phosphorus Sulfide (Remaining Product 1)/LiBr=63.75/21.25/15:MM (Dry) Method–205° C. (Peak Top Temperature) Heat-Treated Crystalline Solid Electrolyte]

0.7 g of the sulfide glass synthesized in Comparative Example 1 was put in a 50 ml-Schlenk bottle in an argon atmosphere. The Schlenk bottle was put in an oil bath that had been heated to 205° C. in advance, and subjected to a heat treatment for 2 hours, whereby a crystalline solid electrolyte was obtained. For the resulting crystalline solid electrolyte, differential thermogravimetry was conducted in the same manner as in Example 1. The results are shown in FIG. 2 and Table 3.

Comparative Example 3

[Raw Material Ratio: Lithium Sulfide/Phosphorus Sulfide (Remaining Product 1)/LiBr=63.75/21.25/15:MM (Dry) Method–202° C. (Peak Top Temperature–3° C.) Heat-Treated Crystalline Solid Electrolyte]

The crystalline solid electrolyte was produced and evaluated in the same manner as in Comparative Example 2, except that the heat treatment temperature was changed to 202° C. The results are shown in FIG. 2 and Table 3.

Comparative Example 4

[Raw Material Ratio: Lithium Sulfide/Phosphorus Sulfide (Remaining Product 1)/LiBr=63.75/21.25/15:MM (Dry) Method–200° C. (Peak Top Temperature–5° C.) Heat-Treated Crystalline Solid Electrolyte]

The crystalline solid electrolyte was produced and evaluated in the same manner as in Comparative Example 2, except that the heat treatment temperature was changed to 200° C. The results are shown in FIG. 2 and Table 3.

Comparative Example 5

[Raw Material Ratio: Lithium Sulfide/Phosphorus Sulfide (Remaining Product 1)/LiBr=63.75/21.25/15:MM (Dry) Method–225° C. (between Tc1 and Tc2) Heat-Treated Crystalline Solid Electrolyte]

The crystalline solid electrolyte was produced and evaluated in the same manner as in Comparative Example 2, except that the heat treatment temperature was changed to 225° C. The results are shown in FIG. 2 and Table 3.

Example 6

[Raw Material Ratio: Lithium Sulfide/Phosphorus Sulfide (Extract 2)/LiBr=63.75/21.25/15:MM (Wet) Method]

(1) Synthesis of Sulfide Glass

The lithium sulfide produced in the Production Example 1, the phosphorus sulfide (extract 2) produced in the Production Example 4 and LiBr (manufactured by Honjo Chemical Corporation) were used as starting materials. About 10 g of a mixture obtained by mixing them such that the molar ratio thereof became lithium sulfide:phosphorus sulfide:LiBr=63.75:21.25:15, 100 mL of toluene (manufactured by Wako Pure Chemical Industries, Ltd.) of which the water content became 10 ppm or less as measured by means of a Karl Fischer Moisture meter by a dehydration treatment, and 600 g of zirconia balls each having a diameter of 2 mm were put in an aluminum pot (500 mL) of a planetary ball mill (Model P-5, manufactured by Fritsch Japan), and the pot was completely sealed. The inside of the pot was allowed to be an argon atmosphere. Mechanical milling was conducted at a rotational speed of a planetary ball mill of 220 rpm for 40 hours, whereby sulfide glass was synthesized. A toluene slurry of this sulfide glass was taken in a Schlenk bottle in a glove box. After removing a supernatant, drying was conducted under vacuum (less than 1 Torr or less than about 130 Pa, ordinary temperature) for 5 hours, whereby white powder of sulfide glass was obtained.

Figure 3:
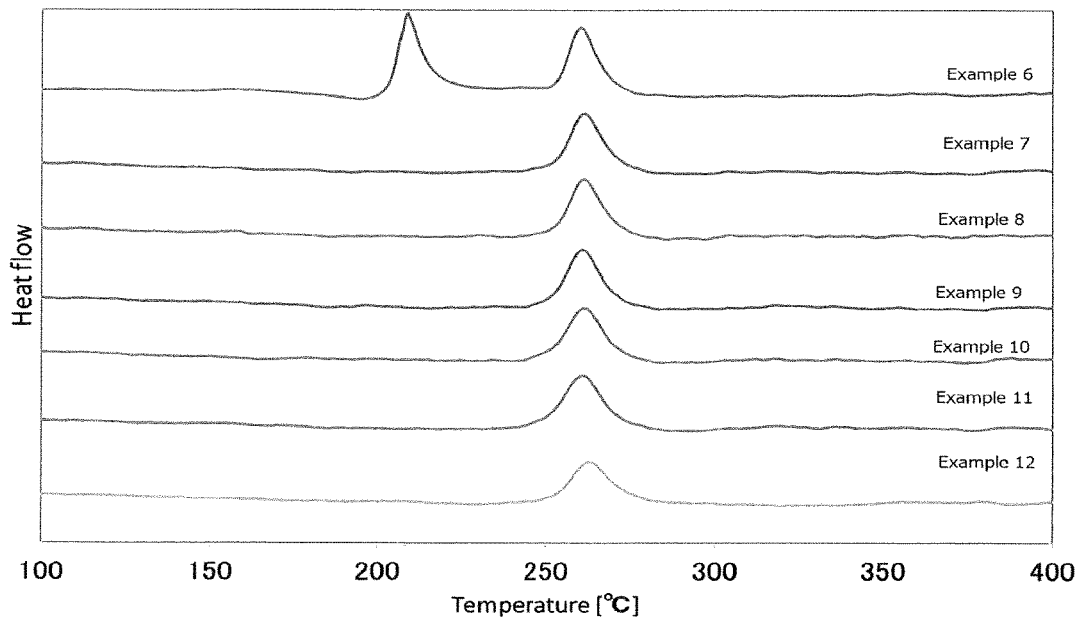
FIG. 3 is a view showing the results of an analysis by differential thermogravimetry of the sulfide glass or the crystalline solid electrolyte produced in Examples 6 to 12.

The sulfide glass was evaluated in the same manner as in Example 1. The results are shown in FIG. 3 and Table 3.

Comparative Example 6

[Lithium Sulfide/Phosphorus Sulfide (Remaining Product 2)/LiBr=63.75/21.25/15:MM (Wet) Method]

Figure 4:
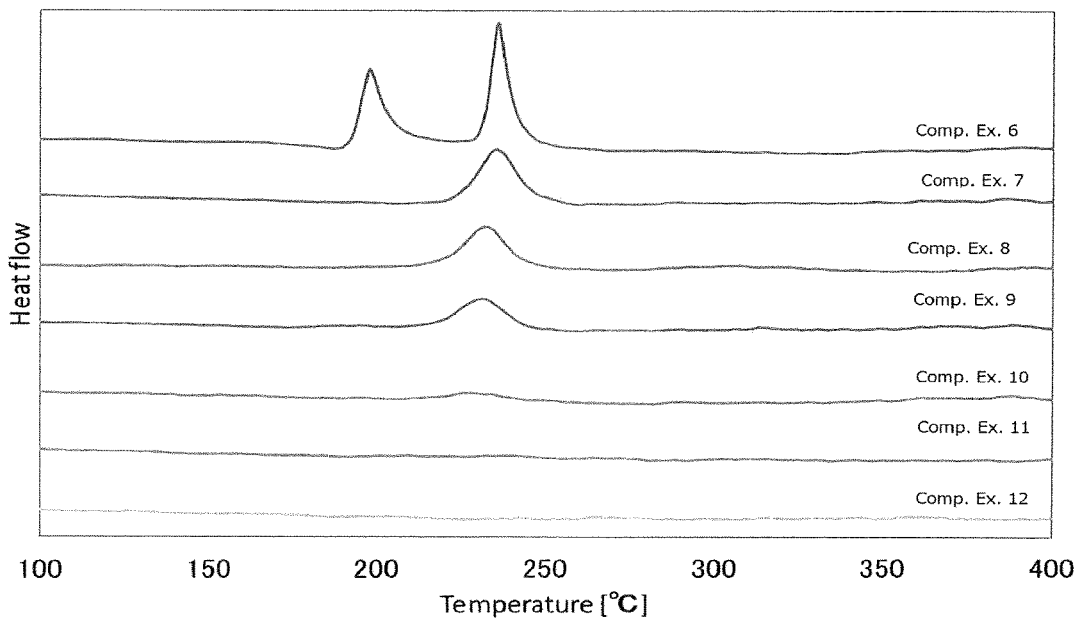
FIG. 4 is a view showing the results of an analysis by differential thermogravimetry of the sulfide glass or the crystalline solid electrolyte produced in Comparative Examples 6 to 12.

The sulfide glass was produced and evaluated in the same manner as in Example 6, except that the phosphorus sulfide used as the raw material was changed to the phosphorus sulfide (Remaining Product 2) produced in Production Example 5. The results are shown in FIG. 4 and Table 3.

Example 7

[Raw Material Ratio: Lithium Sulfide/Phosphorus Sulfide (Extract 2)/LiBr=63.75/21.25/15:MM (Wet) Method–204° C. (Peak Top Temperature–5° C.) Heat-Treated Crystalline Solid Electrolyte]

0.9 g of the sulfide glass synthesized in Example 6 was put in 50 ml-Schlenk bottle in an argon atmosphere and sealed. The Schlenk bottle was put in an oil bath that had been heated in advance to 204° C., and a heat treatment was conducted for 2 hours, whereby a crystalline solid electrolyte was obtained. For the resulting crystalline solid electrolyte, differential thermogravimetry was conducted in the same manner as in Example 1. The results are shown in FIG. 3 and Table 3.

Example 8

[Raw Material Ratio: Lithium Sulfide/Phosphorus Sulfide (Extract 2)/LiBr=63.75/21.25/15:MM (Wet) Method–206° C. (Peak Top Temperature–3° C.) Heat-Treated Crystalline Solid Electrolyte]

The crystalline solid electrolyte was produced and evaluated in the same manner as in Example 7, except that the heat treatment temperature was changed to 206° C. The results are shown in FIG. 3 and Table 3.

Example 9

[Raw Material Ratio: Lithium Sulfide/Phosphorus Sulfide (Extract 2)/LiBr=63.75/21.25/15:MM (Wet) Method–209° C. (Peak-Top Temperature) Heat-Treated Crystalline Solid Electrolyte]

A crystalline solid electrolyte was produced and evaluated in the same manner as in Example 7, except that the heat treatment temperature was changed to 209° C. The results are shown in FIG. 3 and Table 3.

Example 10

[Raw Material Ratio: Lithium Sulfide/Phosphorus Sulfide (Extract 2)/LiBr=63.75/21.25/15:MM (Wet) Method–212° C. (Peak Top Temperature+3° C.) Heat-Treated Crystalline Solid Electrolyte]

A crystalline solid electrolyte was produced and evaluated in the same manner as in Example 7, except that the heat treatment temperature was changed to 212° C. The results are shown in FIG. 3 and Table 3.

Example 11

[Raw Material Ratio: Lithium Sulfide/Phosphorus Sulfide (Extract 2)/LiBr=63.75/21.25/15:MM (Wet) Method–214° C. (Peak Top Temperature+5° C.) Heat-Treated Crystalline Solid Electrolyte]

A crystalline solid electrolyte was produced and evaluated in the same manner as in Example 7, except that the heat treatment temperature was changed to 214° C. The results are shown in FIG. 3 and Table 3.

Example 12

[Raw Material Ratio: Lithium Sulfide/Phosphorus Sulfide (Extract 2)/LiBr=63.75/21.25/15:MM (Wet) Method–215° C. (between Tc1 and Tc2) Heat-Treated Crystalline Solid Electrolyte]

A crystalline solid electrolyte was produced and evaluated in the same manner as in Example 7, except that the heat treatment temperature was changed to 215° C. The results are shown in FIG. 3 and Table 3.

Comparative Example 7

[Raw Material Ratio: Lithium Sulfide/Phosphorus Sulfide (Remaining Product 2)/LiBr=63.75/21.25/15:MM (Wet) Method–193° C. (Peak Top Temperature–5° C.) Heat-Treated Glass Ceramics]

0.9 g of the sulfide glass synthesized in Comparative Example 6 was put in 50 ml-Schlenk bottle in an argon atmosphere and sealed. The Schlenk bottle was put in an oil bath that had been heated in advance to 193° C., and a heat treatment was conducted for 2 hours, whereby a crystalline solid electrolyte was obtained. For the resulting crystalline solid electrolyte, differential thermogravimetry was conducted in the same manner as in Example 1. The results are shown in FIG. 4 and Table 3.

Comparative Example 8

[Raw Material Ratio: Lithium Sulfide/Phosphorus Sulfide (Remaining Product 2)/LiBr=63.75/21.25/15:MM (Wet) Method–195° C. (Peak Top Temperature–3° C.) Heat-Treated Crystalline Solid Electrolyte]

A crystalline solid electrolyte was produced and evaluated in the same manner as in Comparative Example 7, except that the heat treatment temperature was changed to 195° C. The results are shown in FIG. 4 and Table 3.

Comparative Example 9

[Raw Material Ratio: Lithium Sulfide/Phosphorus Sulfide (Remaining Product 2)/LiBr=63.75/21.25/15:MM (Wet) Method–198° C. (Peak Top Temperature) Heat-Treated Crystalline Solid Electrolyte]

A crystalline solid electrolyte was produced and evaluated in the same manner as in Comparative Example 7, except that the heat treatment temperature was changed to 198° C. The results are shown in FIG. 4 and Table 3.

Comparative Example 10

[Raw Material Ratio: Lithium Sulfide/Phosphorus Sulfide (Remaining Product 2)/LiBr=63.75/21.25/15:MM (Wet) Method–201° C. (Peak Top Temperature+3° C.) Heat-Treated Crystalline Solid Electrolyte]

A crystalline solid electrolyte was produced and evaluated in the same manner as in Comparative Example 7, except that the heat treatment temperature was changed to 201° C. The results are shown in FIG. 4 and Table 3.

Comparative Example 11

[Raw Material Ratio: Lithium Sulfide/Phosphorus Sulfide (Remaining Product 2)/LiBr=63.75/21.25/15:MM (Wet) Method–203° C. (Peak Top Temperature+5° C.) Heat-Treated Crystalline Solid Electrolyte]

A crystalline solid electrolyte was produced and evaluated in the same manner as in Comparative Example 7, except that the heat treatment temperature was changed to 203° C. The results are shown in FIG. 4 and Table 3.

Comparative Example 12

[Raw Material Ratio: Lithium Sulfide/Phosphorus Sulfide (Remaining Product 2)/LiBr=63.75/21.25/15:MM (Wet) Method–215° C. (between Tc1 and Tc2) Heat-Treated Crystalline Solid Electrolyte]

A crystalline solid electrolyte was produced and evaluated in the same manner as in Comparative Example 7, except that the heat treatment temperature was changed to 215° C. The results are shown in FIG. 4 and Table 3.

Comparative Example 13

[Lithium Sulfide/Phosphorus Sulfide (Commercial Product)/LiBr=63.75/21.25/15:MM (Dry) Method]

Figure 5:
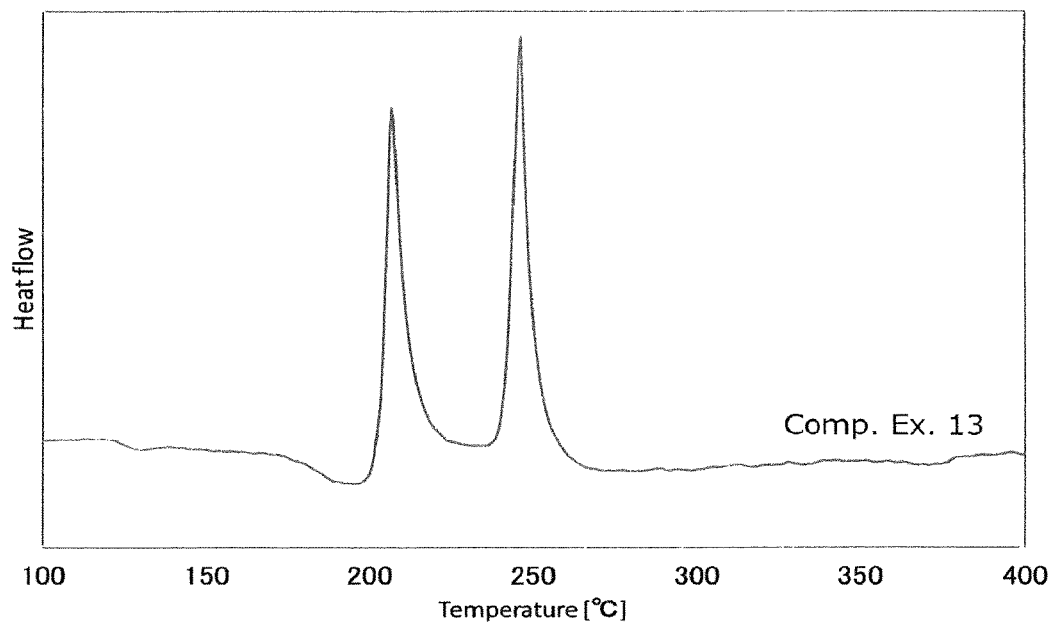
FIG. 5 is a view showing the results of an analysis by differential thermogravimetry of the sulfide glass or the crystalline solid electrolyte produced in Comparative Example 13.

Sulfide glass was produced and evaluated in the same manner as in Example 1, except that phosphorus sulfide used as a raw material was changed to a commercially-available phosphorus sulfide. The results are shown in FIG. 5 and Table 3.

Comparative Example 14

[Lithium Sulfide/Phosphorus Sulfide (Commercially-Available Phosphorus Sulfide)/LiBr=63.75/21.25/15:MM (Wet) Method]

Figure 6:
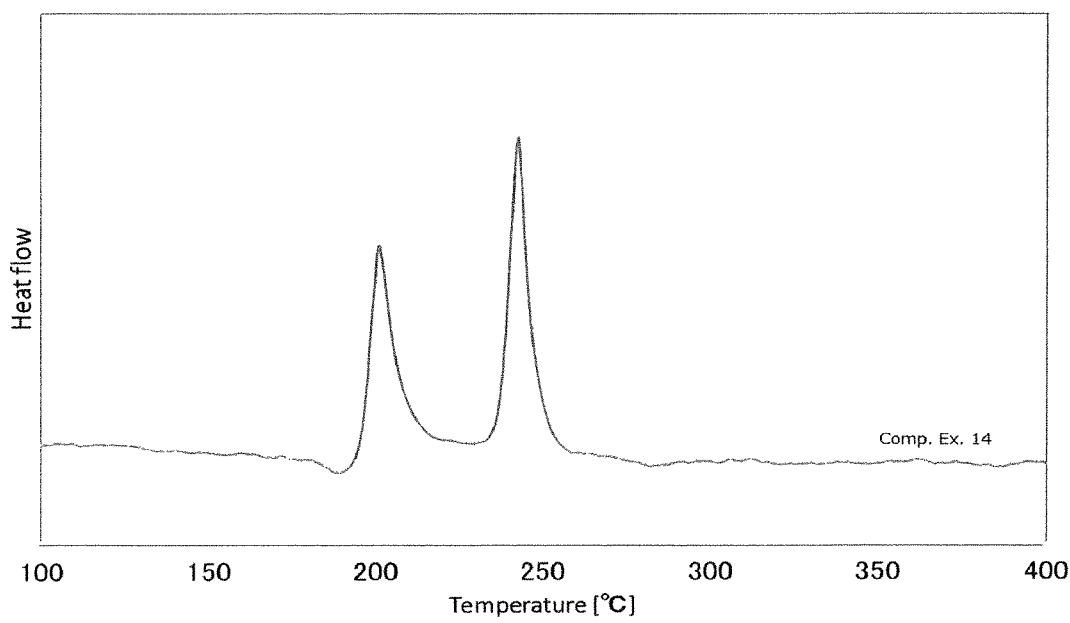
FIG. 6 is a view showing the results of an analysis by differential thermogravimetry of the sulfide glass or the crystalline solid electrolyte produced in Comparative Example 14.

Sulfide glass was produced and evaluated in the same manner as in Comparative Example 6, except that phosphorus sulfide used as a raw material was changed to a commercial product. The results are shown in FIG. 6 and Table 3.

Example 13

[Raw Material Ratio: Lithium Sulfide/Phosphorus Sulfide (Extract 1)=75/25:MM (Wet) Method]
(1) Synthesis of Sulfide Glass The lithium sulfide produced in the Production Example 1 and the phosphorus sulfide (extract 1) produced in the Production Example 2 were used as starting materials. About 10 g of a mixture obtained by mixing them such that the molar ratio thereof became lithium sulfide:phosphorus sulfide=75:25, 100 mL of toluene (special grade, manufactured by Wako Pure Chemical Industries, Ltd.) of which the water content became 10 ppm or less as measured by means of a Karl Fischer Moisture meter by a dehydration treatment, and 600 g of zirconia balls each having a diameter of 2 mm were put in an aluminum pot (500 mL) of a planetary ball mill (Model P-5, manufactured by Fritsch Japan), and the pot was completely sealed. The inside of the pot was allowed to be an argon atmosphere. Mechanical milling was conducted at a rotational speed of a planetary ball mill of 220 rpm for 40 hours, whereby sulfide glass was synthesized. A toluene slurry of this sulfide glass was taken in a Schlenk bottle in a glove box. After removing a supernatant, drying was conducted under vacuum (less than 1 Torr or less than about 130 Pa, normal temperature) for 5 hours, whereby white powder of sulfide glass was obtained.

For the resulting sulfide glass, differential thermogravimetry was conducted in the same manner as in Example 1.

FIG. 7 shows the results of an analysis of differential thermogravimetry. Further, Tc1 and Tc2 are shown in Table 3.

Figure 8:
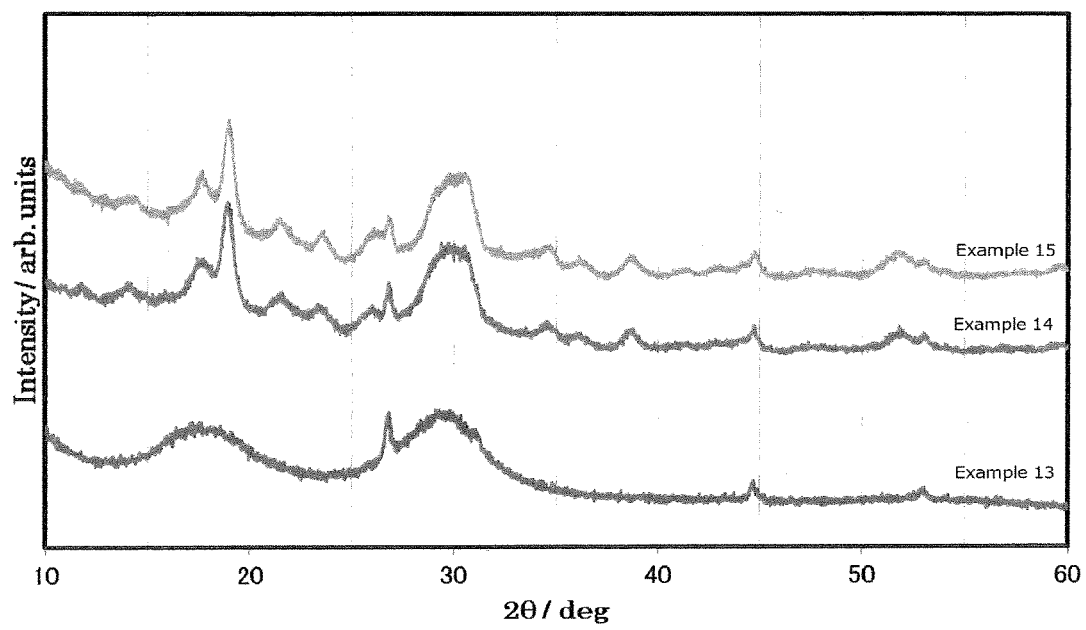
FIG. 8 is a powder X-ray diffraction pattern of the sulfide glass or the crystalline solid electrolyte produced in Examples 13 to 15.

Further, a powder X-ray diffraction (XRD) pattern of the prepared sulfide glass is shown in FIG. 8.

Powder X-ray diffractometry was conducted as follows:

From the synthesized product obtained, a circular pellet having a diameter of 10 mm and a height of 0.1 to 0.3 cm was molded and used as a sample. This sample was used for the measurement without exposing to air by using air-tight sample holder for XRD. The 2θ position of the diffraction peak was determined by the gravity method by using an XRD analysis program JADE.

The powder X-ray diffractometry was conducted by using a powder X-ray diffraction apparatus (SmartLab) manufactured by Rigaku Corporation under the following conditions:

Tube voltage: 45 kV
Tube current: 200 mA
X-ray wavelength: Cu-Kα ray (1.5418 Å)
Optical system:Parallel beam method
Slit configuration: Solar slit 5°, entrance slit 1 mm, receiving slit 1 mm
Detector:Scintillation counter
Measurement range: 2θ=10-60°
Step width, Scanning Speed: 0.02°, 1°/min

Example 14

[Raw Material Ratio: Lithium Sulfide/Phosphorus Sulfide (Extract 1)=75/25:MM (Wet) Method–274° C. (Peak Top) Heat-Treated Crystalline Solid Electrolyte]

1 g of the sulfide glass synthesized in Example 13 was put in a 50 ml-Schlenk bottle in an argon atmosphere and sealed. The Schlenk bottle was put in an oil bath that had been heated in advance to 274° C., and a heat treatment was conducted for 2 hours, whereby a crystalline solid electrolyte was obtained.

For the resulting crystalline solid electrolyte, differential thermogravimetry was conducted in the same manner as in Example 1. In addition, in the same manner as in Example 2, the peak intensity ratio before and after the heat treatment (Hc1/Hc1p and Hc2/Hc2p) was measured. The results are shown in FIG. 7 and Table 3.

For the resulting crystalline solid electrolyte, powder X-ray diffractometry was conducted in the same manner as in Example 13. The resulting powder X-ray diffraction pattern is shown in FIG. 8 and the main peak positions are shown in Table 4. In Table 4, only the representable peak positions are shown.

TABLE 4

| Example 14 | Example 15 |
|---|---|
| 2θ = 17.6 deg | 2θ = 17.6 deg |
| 2θ = 18.9 deg | 2θ = 18.9 deg |
| 2θ = 21.5 deg | 2θ = 21.5 deg |
| 2θ = 23.4 deg | 2θ = 23.6 deg |
| 2θ = 34.6 deg | 2θ = 34.7 deg |
| 2θ = 38.6 deg | 2θ = 38.6 deg |

Example 15

[Raw Material Ratio: Lithium Sulfide/Phosphorus Sulfide (Extract 1)=75/25:MM (Wet) Method–300° C. (in the Vicinity of Peak End) Heat-Treated Crystalline Solid Electrolyte]

A crystalline solid electrolyte was produced and evaluated in the same manner as in Example 14, except that the heat treatment temperature was changed to 300° C. The results are shown in FIG. 7 and Table 3.

For the resulting sulfide glass, powder X-ray diffractometry was conducted in the same manner as in Example 13. The resulting powder X-ray diffraction pattern is shown in FIG. 8 and the main peak positions are shown in Table 4. In Table 4, only the representable peak positions are shown.

Comparative Example 15

[Lithium Sulfide/phosphorus Sulfide (Commercially-Available Phosphorus Pentasulfide)=75/25:MM (Wet) Method]

Figure 9:
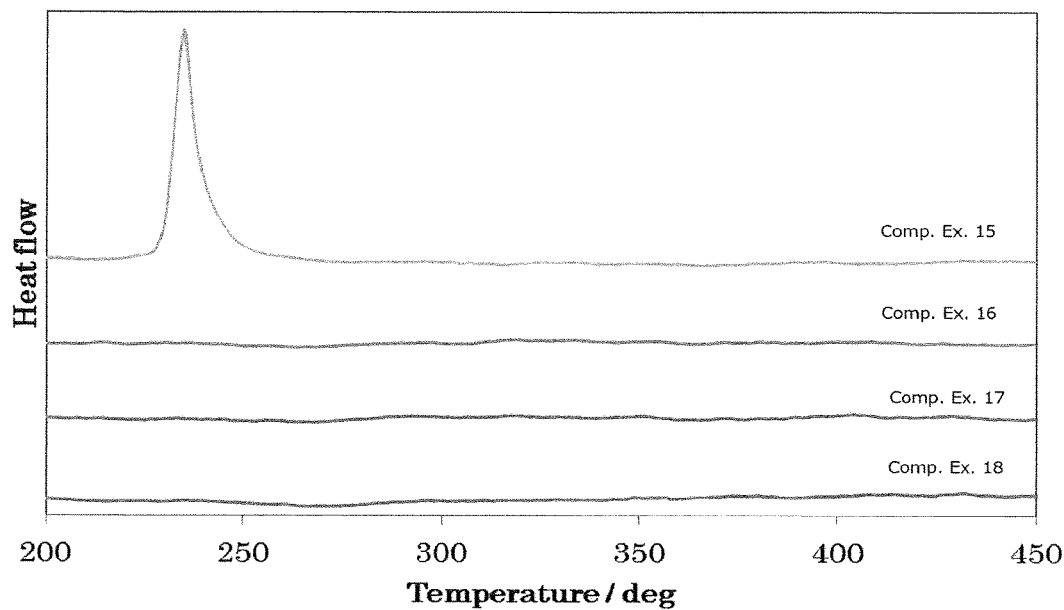
FIG. 9 is a view showing the results of an analysis by differential thermogravimetry of the sulfide glass or the crystalline solid electrolyte produced in Comparative Examples 15 to 18.

Sulfide glass was produced and evaluated in the same manner as in Example 1, except that the phosphorus sulfide used as a raw material was changed to commercially-available phosphorus pentasulfide. The results are shown in FIG. 9 and Table 3.

Figure 10:
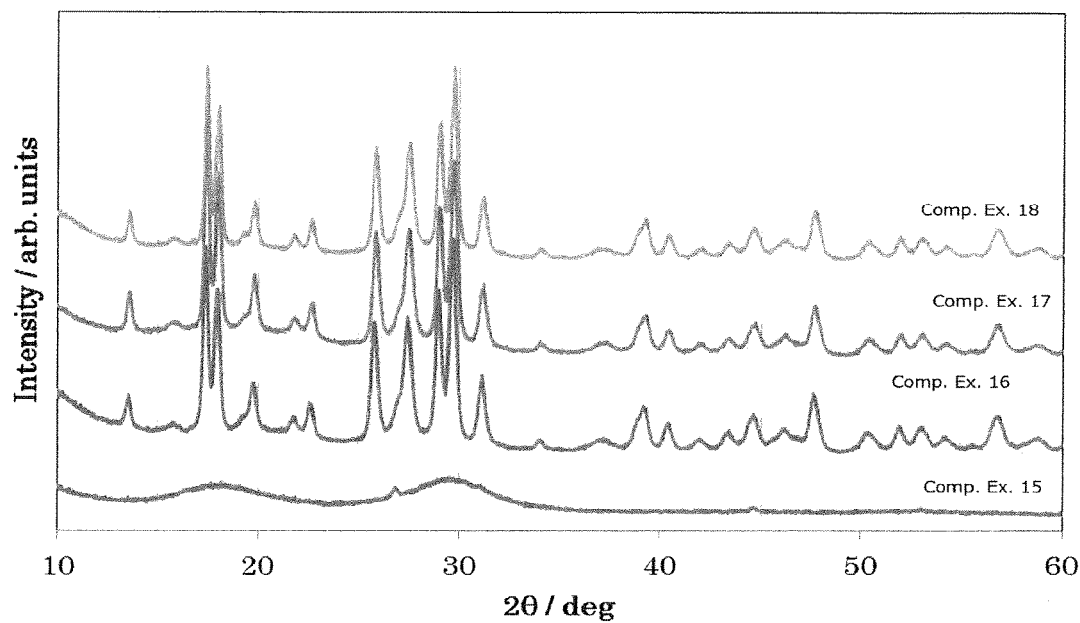
FIG. 10 is a view showing a powder X-ray diffraction pattern of the sulfide glass or the crystalline solid electrolyte produced in Comparative Examples 15 to 18.

For the resulting sulfide glass, powder X-ray diffractometry was conducted in the same manner as in Example 13. The resulting powder X-ray diffraction pattern is shown in FIG. 10.

Comparative Example 16

[Lithium Sulfide/phosphorus Sulfide (Commercially-Available Phosphorus Pentasulfide)=75/25:MM (Wet) Method–230° C. (Peak Top–5° C.) Heat-Treated Crystalline Solid Electrolyte]

1 g of the sulfide glass prepared in Comparative Example 15 was put in 50 ml-Schlenk bottle in an argon atmosphere and sealed. The Schlenk bottle was put in an oil bath that had been heated in advance to 230° C., and a heat treatment was conducted for 2 hours, whereby a crystalline solid electrolyte was obtained. For the resulting crystalline solid electrolyte, differential thermogravimetry was conducted in the same manner as in Example 1. The results are shown in FIG. 9 and Table 3.

For the resulting crystalline solid electrolyte, powder X-ray diffractometry was conducted in the same manner as in Example 13, and the resulting powder X-ray diffraction pattern is shown in FIG. 10. The peak of the powder X-ray diffraction pattern of the crystalline solid electrolyte could not be observed at any of the positions corresponding to (A) $2\theta=18.9\pm0.5$ deg, (C) $2\theta=38.6\pm0.5$ deg, (E) $2\theta=23.5\pm0.5$ deg and (F) $2\theta=34.6\pm0.5$ deg.

Comparative Example 17

[Lithium Sulfide/Phosphorus Sulfide (Commercially-Available Phosphorus Pentasulfide)=75/25:MM (Wet) Method–235° C. (Peak Top) Heat-Treated Crystalline Solid Electrolyte]

1 g of sulfide glass prepared in Comparative Example 15 was put in 50 ml-Schlenk bottle in an argon atmosphere and sealed. The Schlenk bottle was put in an oil bath heated in advance to 235° C., and a heat treatment was conducted for 2 hours, whereby a crystalline solid electrolyte was obtained. For the resulting crystalline solid electrolyte, differential thermogravimetry was conducted in the same manner as in Example 1. The results are shown in FIG. 9 and Table 3.

For the resulting crystalline solid electrolyte, powder X-ray diffractometry was conducted in the same manner as in Example 13, and the resulting powder X-ray diffraction pattern is shown in FIG. 10. The peak of the crystalline X-ray diffraction pattern could not be observed at any of positions corresponding to the above-mentioned (A) $2\theta=18.9\pm0.5$ deg, (C) $2\theta=38.6\pm0.5$ deg, (E) $2\theta=23.5\pm0.5$ deg and (F) $2\theta=34.6\pm0.5$ deg.

Comparative Example 18

[Lithium Sulfide/Phosphorus Sulfide (Commercially-Available Phosphorus Pentasulfide)=75/25:MM (Wet) Method–240° C. (Peak Top+5° C.) Heat-Treated Crystalline Solid Electrolyte]

1 g of sulfide glass prepared in Comparative Example 15 was put in 50 ml-Schlenk bottle in an argon atmosphere and sealed. The Schlenk bottle was put in an oil bath that has been heated in advance to 240° C., and a heat treatment was conducted for 2 hours, whereby a crystalline solid electrolyte was obtained. For the resulting crystalline solid electrolyte, differential thermogravimetry was conducted in the same manner as in Example 1. The results are shown in FIG. 9 and Table 3.

For the resulting crystalline solid electrolyte, powder X-ray diffractometry was conducted in the same manner as in Example 13, and the resulting powder X-ray diffraction pattern is shown in FIG. 10. The peak of the power X-ray diffraction pattern could not be observed at any of positions corresponding to the above-mentioned (A) $2\theta=18.9\pm0.5$ deg, (C) $2\theta=38.6\pm0.5$ deg, (E) $2\theta=23.5\pm0.5$ deg and (F) $2\theta=34.6\pm0.5$ deg.

From the results of the Examples and the Comparative Examples, it can be understood that the solid electrolyte of the Examples can be heated at a wide range of temperatures for crystallization. On the other hand, the solid electrolyte of the Comparative Examples is crystalized by heating at a narrow range of temperatures. This corresponds to difference in temperature between Tc1 and Tc2.

INDUSTRIAL APPLICABILITY

The production method of the invention is preferable as the method for producing a solid electrolyte.

The crystalline solid electrolyte and the sulfide glass of the invention can be used as constitutional elements of a lithium ion battery, e.g. a positive electrode, a negative electrode, an electrolyte layer or the like.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The documents described in the specification and the specification of Japanese application(s) on the basis of which the present application claims Paris convention priority are incorporated herein by reference in its entirety.

The invention claimed is:

1. A method comprising producing sulfide glass from a raw material comprising phosphorus sulfide satisfying a formula (1):

$$100 \times A/B \geq 37 \quad (1)$$

wherein in the formula, A is peak areas of peaks that appear at peak positions in a range of 57.2 ppm or more and 58.3 ppm or less, and 63.0 ppm or more and 64.5 ppm or less in $^{31}$PNMR spectroscopy, and B is the total of peak areas of all peaks measured in $^{31}$PNMR spectroscopy.

2. A method comprising producing sulfide glass from a raw material comprising phosphorus sulfide satisfying a formula (2):

$$37 \leq 100 \times (A+D)/B \leq 70 \quad (2)$$

wherein in the formula, A is peak areas of peaks that appear at peak positions in a range of 57.2 ppm or more and 58.3 ppm or less, and 63.0 ppm or more and 64.5 ppm or less in $^{31}$PNMR spectroscopy, D is peak areas of peaks that appear at peak positions in a range of 84.0 ppm or more and 86.0 ppm or less, and 110 ppm or more and 113 ppm or less in $^{31}$PNMR spectroscopy, and B is the total of peak areas of all peaks measured in $^{31}$PNMR spectroscopy.

3. The method of claim 1, wherein the phosphorus sulfide further satisfies a formula (2):

$$37 \leq 100 \times (A+D)/B \leq 70 \quad (2)$$

wherein in the formula, A is peak areas of peaks that appear at peak positions in a range of 57.2 ppm or more and 58.3 ppm or less, and 63.0 ppm or more and 64.5 ppm or less in $^{31}$PNMR spectroscopy, D is peak areas of peaks that appear at peak positions in a range of 84.0 ppm or more and 86.0 ppm or less, and 110 ppm or more and 113 ppm or less in $^{31}$PNMR spectroscopy, and B is the total of peak areas of all peaks measured in $^{31}$PNMR spectroscopy.

4. The method of claim 1, wherein the phosphorus sulfide further satisfies formulas (3) and (4):

$$37 \leq 100 \times A/B \leq 60 \quad (3)$$

$$25 \leq 100 \times C/B \leq 60 \quad (4)$$

wherein in the formulas, A is peak areas of peaks that appear at peak positions in a range of 57.2 ppm or more and 58.3 ppm or less, and 63.0 ppm or more and 64.5 ppm or less in $^{31}$PNMR spectroscopy, C is peak areas of peaks that appear in a range of 56.6 ppm or more and 57.1 ppm or less in $^{31}$PNMR spectroscopy, and B is the total of peak areas of all peaks measured in $^{31}$PNMR spectroscopy.

5. The method of claim 1, wherein the phosphorus sulfide further satisfies formulas (3), (4) and (5):

$$37 \leq 100 \times A/B \leq 60 \quad (3)$$

$$25 \leq 100 \times C/B \leq 60 \quad (4)$$

$$0 \leq 100 \times D/B \leq 10 \quad (5)$$

wherein in the formulas, A is peak areas of peaks that appear at peak positions in a range of 57.2 ppm or more and 58.3 ppm or less, and 63.0 ppm or more and 64.5 ppm or less in $^{31}$PNMR spectroscopy, C is peak areas of peaks that appear in a range of 56.6 ppm or more and 57.1 ppm or less in $^{31}$PNMR spectroscopy, and D is peak areas of peaks that appear in a range of 84.0 ppm or more and 86.0 ppm or less, and 110 ppm or more and 113 ppm or less, and B is the total of peak areas of all peaks measured in $^{31}$PNMR spectroscopy.

6. The method of claim 3, wherein the phosphorus sulfide further satisfies formulas (3), (4) and (5):

$$37 \leq 100 \times A/B \leq 60 \quad (3)$$

$$25 \leq 100 \times C/B \leq 60 \quad (4)$$

$$0 \leq 100 \times D/B \leq 10 \quad (5)$$

wherein in the formulas, A is peak areas of peaks that appear at peak positions in a range of 57.2 ppm or more and 58.3 ppm or less, and 63.0 ppm or more and 64.5 ppm or less in $^{31}$PNMR spectroscopy, C is peak areas of peaks that appear in a range of 56.6 ppm or more and 57.1 ppm or less in $^{31}$PNMR spectroscopy, and D is peak areas of peaks that appear in a range of 84.0 ppm or more and 86.0 ppm or less, and 110 ppm or more and 113 ppm or less, and B is the total of peak areas of all peaks measured in $^{31}$PNMR spectroscopy.

7. The method of claim 1, wherein the phosphorus sulfide further satisfies formulas (3) and (6):

$$37 \leq 100 \times A/B \leq 60 \quad (3)$$

$$0.1 \leq 100 \times D/B \leq 10 \quad (6)$$

wherein in the formulas, A is peak areas of peaks that appear at peak positions in a range of 57.2 ppm or more and 58.3 ppm or less, and 63.0 ppm or more and 64.5 ppm or less in $^{31}$PNMR spectroscopy, D is peak areas of peaks that appear in a range of 84.0 ppm or more and 86.0 ppm or less, and 110 ppm or more and 113 ppm or less, and B is the total of peak areas of all peaks measured in $^{31}$PNMR spectroscopy.

8. The method of claim 1, wherein the phosphorus sulfide further satisfies a formula (3), and the raw material further comprises lithium sulfide:

$$37 \leq 100 \times A/B \leq 60 \quad (3)$$

wherein in the formulas, A is peak areas of peaks that appear at peak positions in a range of 57.2 ppm or more and 58.3 ppm or less, and 63.0 ppm or more and 64.5 ppm or less in $^{31}$PNMR spectroscopy, and B is the total of peak areas of all peaks measured in $^{31}$PNMR spectroscopy.

9. The method of claim 8, wherein the raw material further comprises a lithium halide.

10. The method of claim 9, wherein the raw material is mixed in a solvent.

11. The method of claim 10, wherein the solvent is a hydrocarbon solvent.

12. The method of claim 1, wherein the phosphorus sulfide further satisfies a formula (3), and the raw material is mixed in a solvent:

$$37 \leq 100 \times A/B \leq 60 \quad (3)$$

wherein in the formulas, A is peak areas of peaks that appear at peak positions in a range of 57.2 ppm or more and 58.3 ppm or less, and 63.0 ppm or more and 64.5 ppm or less in $^{31}$PNMR spectroscopy, and B is the total of peak areas of all peaks measured in $^{31}$PNMR spectroscopy.

13. The method of claim 3, wherein the raw material further comprises lithium sulfide and a lithium halide.

14. The method of claim 13, wherein the raw material is mixed in a solvent.

15. The method of claim 2, wherein the phosphorus sulfide further satisfies formula (4):

$$25 \leq 100 \times C/B \leq 60 \quad (4)$$

wherein in the formula, C is peak areas of peaks that appear in a range of 56.6 ppm or more and 57.1 ppm or less in $^{31}$PNMR spectroscopy, and B is the total of peak areas of all peaks measured in $^{31}$PNMR spectroscopy.

16. The method of claim 2, wherein the raw material further comprises lithium sulfide.

17. The method of claim 16, wherein the raw material further comprises a lithium halide.

18. The method of claim 17, wherein the phosphorus sulfide further satisfies formula (4):

$$25 \leq 100 \times C/B \leq 60 \quad (4)$$

wherein in the formula, C is peak areas of peaks that appear in a range of 56.6 ppm or more and 57.1 ppm or less in $^{31}$PNMR spectroscopy, and B is the total of peak areas of all peaks measured in $^{31}$PNMR spectroscopy.

\* \* \* \* \*